(12) United States Patent
Makam et al.

(10) Patent No.: US 11,544,011 B1
(45) Date of Patent: Jan. 3, 2023

(54) WRITE INVALIDATION OF A REMOTE LOCATION CACHE ENTRY IN A NETWORKED STORAGE SYSTEM

(71) Applicant: NETAPP, INC., San Jose, CA (US)

(72) Inventors: Sumith Makam, Bangalore (IN); Rahul Thapliyal, Bangalore (IN); Kartik R, Bangalore (IN); Roopesh Chuggani, Jaipur (IN); Abhisar Lnu, Gautam Buddha Nagar (IN); Maria Josephine Priyanka S, Chennai (IN)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 17/387,792

(22) Filed: Jul. 28, 2021

(51) Int. Cl.
G06F 3/06 (2006.01)
(52) U.S. Cl.
CPC .......... *G06F 3/0659* (2013.01); *G06F 3/0604* (2013.01); *G06F 3/067* (2013.01); *G06F 3/0619* (2013.01)
(58) Field of Classification Search
CPC .... G06F 3/0659; G06F 3/0604; G06F 3/0619; G06F 3/067
See application file for complete search history.

(56) References Cited

U.S. PATENT DOCUMENTS

| | | | |
|---|---|---|---|
| 9,021,303 B1 | 4/2015 | Desouter et al. | |
| 9,501,542 B1 | 11/2016 | Natanzon | |
| 9,830,263 B1 | 11/2017 | Devor et al. | |
| 10,114,581 B1 | 10/2018 | Natanzon et al. | |
| 10,402,339 B2 | 9/2019 | Beaverson et al. | |
| 10,545,913 B1 | 1/2020 | Liao et al. | |
| 10,922,009 B2 | 2/2021 | Yudenfriend et al. | |
| 11,210,263 B1 | 12/2021 | Smaldone et al. | |
| 2003/0028819 A1* | 2/2003 | Chiu ................... | G06F 11/2089 714/5.11 |
| 2006/0242283 A1 | 10/2006 | Shaik et al. | |
| 2007/0022087 A1 | 1/2007 | Bahar et al. | |
| 2013/0067123 A1 | 3/2013 | Rizzo et al. | |
| 2014/0082128 A1 | 3/2014 | Beard | |
| 2014/0351151 A1* | 11/2014 | Chiu ................. | G06Q 30/0645 705/307 |
| 2014/0351388 A1 | 11/2014 | Srinivasan et al. | |

(Continued)

OTHER PUBLICATIONS

Google Scholar/Patents—text refined (Year: 2021).
(Continued)

*Primary Examiner* — Hiep T Nguyen
(74) *Attorney, Agent, or Firm* — Loza & Loza, LLP; Tejinder Singh

(57) ABSTRACT

Methods and systems for a networked storage system are provided. One method includes: receiving, by a first storage node, a request to modify data stored using a logical storage object presented by the first storage node, the first storage node communicating with a second storage node configured as a failover partner of the first storage node; transmitting, by the first storage node, an invalidation request to the second storage node to invalidate an entry in a storage location cache of the second storage node, the entry indicating a storage location where data is stored by the first storage node, before modification; and responding, by the first storage node, to the request after modifying the data and upon receiving a response from the second storage node indicating successful invalidation of the entry.

20 Claims, 19 Drawing Sheets

(56) References Cited

U.S. PATENT DOCUMENTS

| | | |
|---|---|---|
| 2015/0046668 A1 | 2/2015 | Hyde, II et al. |
| 2015/0089172 A1 | 3/2015 | Kulkarni |
| 2015/0120659 A1 | 4/2015 | Srivastava et al. |
| 2015/0261633 A1 | 9/2015 | Usgaonkar et al. |
| 2015/0370644 A1 | 12/2015 | Graefe et al. |
| 2016/0127467 A1 | 5/2016 | Mu et al. |
| 2016/0342486 A1 | 11/2016 | Kedem et al. |
| 2017/0094011 A1* | 3/2017 | Cheng ................ G06F 16/2365 |
| 2017/0132095 A1 | 5/2017 | Graefe |
| 2017/0300250 A1 | 10/2017 | Sterns et al. |
| 2018/0144015 A1 | 5/2018 | Mittur Venkataramanappa et al. |
| 2018/0278685 A1 | 9/2018 | Tiwari et al. |
| 2018/0284995 A1 | 10/2018 | Dantkale et al. |
| 2018/0300204 A1 | 10/2018 | Amirishetty et al. |
| 2018/0336229 A1 | 11/2018 | Muehle et al. |
| 2019/0005262 A1 | 1/2019 | Surla et al. |
| 2019/0007206 A1 | 1/2019 | Surla et al. |
| 2020/0081807 A1 | 3/2020 | Keremane et al. |
| 2021/0250400 A1 | 8/2021 | Chu et al. |
| 2021/0279178 A1 | 9/2021 | Soukhman et al. |

OTHER PUBLICATIONS

Google Scholar/Patents, "Virtual Machine Node Trust Relationship Storage," Text Refined, 2021, 11 pages.

Graefe G., et al., "Single-Pass Restore After a Media Failure," Datenbanksysteme fur Business, Technologie und Web, 2015, pp. 217-236.

Graefe G., "Instant Recovery for Data Center Savings," SIGMOD Record, Jun. 2015, vol. 44(2), pp. 29-34.

Netapp.Inc., "Clustered Data ONTAP 8.3 High Availability Configuration Guide," Mar. 2015, pp. 1-143.

Non-Final Office Action on co-pending U.S. Appl. No. 17/387,776 dated May 2, 2022.

Notice of Allowance on co-pending U.S. Appl. No. 17/387,776 dated Jun. 27, 2022.

Notice of Allowance on co-pending U.S. Appl. No. 17/387,815 dated Aug. 17, 2022.

Google Scholar/Patents search—text refined (Year: 2022), 10 pages.

* cited by examiner

R-SLC 120

| Data Container Identifier 502A | Offset (FBN) 506A | Storage Location 514A | Sequence No. 516A | Transaction ID 518A |
|---|---|---|---|---|
| ⋮ | ⋮ | ⋮ | ⋮ | ⋮ |
| Data Container Identifier 502N | Offset (FBN) 506N | Storage Location 514N | Sequence No. 516N | Transaction ID 518N |

R-HAC 146

| Data Container Identifier 502A | Hash ID 520A | FBN 506A | Sequence No. 516A | Attributes 522A |
|---|---|---|---|---|
| ⋮ | ⋮ | ⋮ | ⋮ | ⋮ |
| Data Container Identifier 502N | Hash ID 520N | FBN 506N | Sequence No. 516N | Attributes 522N |

Heartbeat Structure 148

| Disable Bit 524 | Disable-Ack Bit 526 | Disable Bit 528 | Disable-Ack Bit 530 |
|---|---|---|---|

FIG. 5B

WRITE INVALIDATION OF A REMOTE LOCATION CACHE ENTRY IN A NETWORKED STORAGE SYSTEM

TECHNICAL FIELD

The present disclosure relates to networked storage systems, and more particularly, to using a remote storage location cache ("R-SLC") by network storage system nodes, configured as partner nodes for processing read and write requests.

BACKGROUND

Various forms of storage systems are used today. These forms include direct attached storage, network attached storage (NAS) systems, storage area networks (SANs), and others. Storage systems are commonly used for a variety of purposes, such as providing multiple users with access to shared data, backing up data and others.

A storage system typically includes at least one computing system (may also be referred to as a "server", "storage server", "storage node", "storage system node" or "storage controller") executing a storage operating system configured to store and retrieve data on behalf of one or more computing systems at one or more storage devices. The storage operating system exports data stored at storage devices as a storage volume.

In SAN storage arrays (i.e. storage arrays having storage devices accessed using a SAN protocol e.g., Fibre Channel Protocol, iSCSI (Internet Small Computer Systems Interface), FCoE (Fibre Channel over Ethernet) and others all data paths are advertised to a computing device (i.e. a host system) as active paths to access stored data. For example, the computing device can have a network connection to a first storage controller (may also be referred to as a first storage node or first storage system node) and a second storage controller, both controllers are configured as partner nodes. A logical unit (LUN) (i.e. a logical object) owned by the first storage node may be used to store data for the computing device. To read the stored data, a read request can be sent by the computing device to either the first node or the second node. In conventional systems, when the second storage node receives a request for data stored using the first node's LUN, the request is sent to the first node for processing. This can result in undesirable latency in processing the read request. Continuous efforts are being made to develop technology to reduce latency in processing read requests.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures:

FIG. 5B shows an example of a remote storage location cache ("R-SLC") data structure, a hash data structure ("R-HAC") and a heartbeat structure used by two partner storage system nodes, according to aspects of the present disclosure;

DETAILED DESCRIPTION

Figure 1A:
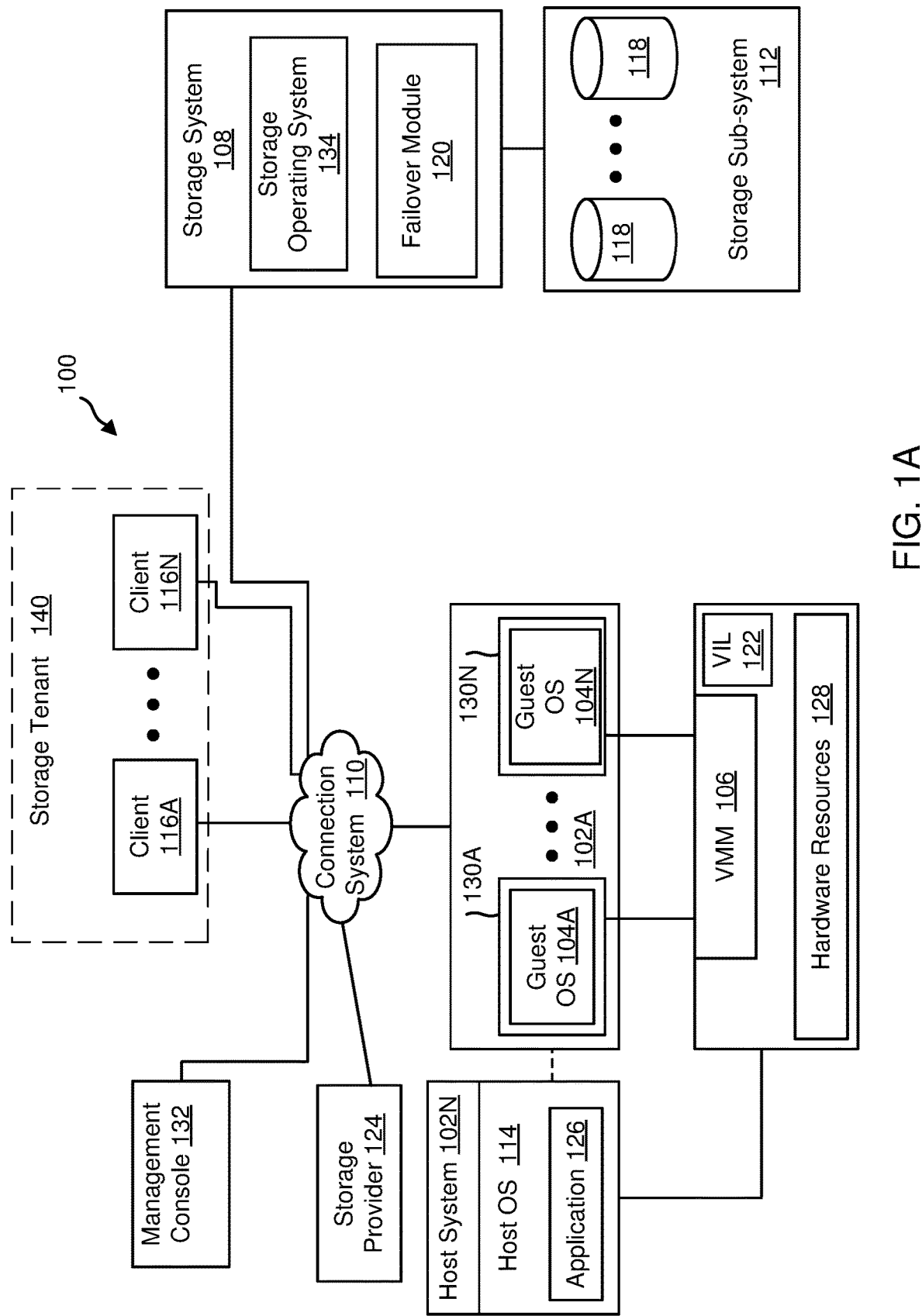
FIG. 1A shows an example of an operating environment for aspects of the present disclosure.

In one aspect, innovative computing technology is disclosed that reduces latency to access data stored by networked storage systems in storage area network ("SAN") arrays. It is noteworthy that the examples of the various aspects of the present disclosure are based on using SAN arrays, however, the various aspects are not limited to just SAN arrays and can be used in any other type of networked storage systems, including networked attached storage ("NAS") systems.

In one aspect, a first storage node (also referred to as a storage server, storage controller, storage system node or first node) and a second storage node are configured as partner nodes, which means if one storage node fails or is likely to fail, then the other node can take over the storage of the failing node. Each storage node uses a remote storage location cache ("R-SLC") that stores storage location information of data that is stored using a logical object (e.g. a LUN/volume) owned by the other node. The R-SLC entries are created when read requests are received from one or more computing devices (may also be referred to as "hosts" or "host systems").

As an example, the second storage node (i.e. the remote node) may receive a read request from a host system to read a file F1 stored at a storage array. F1 is stored by the first storage node using a LUN L1 (i.e. the first storage node is the LUN Owning Node ("LON")). In response to the read request, the second storage node checks the R-SLC to determine if an entry exists for F1. If yes, then data is retrieved by the second storage node and a response is sent to the host system. If an entry is unavailable, the request is forwarded to the first storage node that processes the read request and provides the data and the storage location to the second storage node. The second storage node responds to the read request and adds an entry to the R-SLC indicating the storage location of file F1. When a next read request is received by the second storage node for file F1, the second storage node uses the R-SLC entry to retrieve the stored data for file F1. This reduces the overall latency in read request processing because the second storage node that receives the read request also processes the request, instead of forwarding the read request to the first storage node and waiting for a response.

In one aspect, the first storage node assigns a sequence number when it sends a message to the second storage node, e.g., when there is a change in attribute of an inode (described below). The second storage node receives the sequence number and stores the sequence number with a R-SLC entry. The second storage node uses the sequence number to determine if the R-SLC entry is stale or not. For example, after the entry in the R-SLC has been created, if an inode attribute associated with data associated with the R-SLC entry has changed, the first storage node sends a message with a new sequence number to the second storage node. The second storage node compares the stored sequence number in the stored R-SLC entry with the new sequence number to determine whether the R-SLC entry is stale because the new sequence number will be different (e.g. higher, when the first storage node uses monotonically increasing sequence numbers). This enables the second storage node to determine if an entry in the R-SLC is stale.

In another aspect, a transaction identifier is assigned to a read request received by the second storage node for data stored by the first storage node. The second storage node provides the transaction identifier to the first storage node with the read request, when the R-SLC does not have any entry corresponding to the requested data. The first storage node provides the transaction identifier to the second storage node in a response to the read request. The second storage node verifies the transaction identifier to determine if the data provided by the first storage node can be stored in the R-SLC i.e., whether an entry in the R-SLC can be created. If the transaction identifier received by the second storage node is different than the transaction identifier that was sent to the first storage node, then the response from the first storage node is ignored and no entry is created in the R-SLC for the data requested by the read request. This solves any uncertainty that may exists if there are multiple pending read and write requests for the same data.

In one aspect, the first and second storage nodes maintain a remote hash data structure ("R-HAC"). The R-HAC stores attributes for data stored using remote LUNs (e.g., the second storage node is a remote node with respect to the first storage node, when the first storage node owns a LUN). An entry in R-HAC is created when a request for a remote LUN is received. When a LUN is deleted, the LON sends a message to the remote node to delete the R-HAC entry. When a LUN attribute changes (e.g. if a LUN size changes), the LON sends a message to the remote node with a sequence number. The sequence number ensures that only the most current attributes are stored (or accessed) in the R-HAC In one aspect, a write request may be received by the first storage node to modify data stored the first storage node. The first storage node sends an invalidation request to the second storage node to invalidate any entry associated with the stored data. The first node responds to the write request, after it receives a response from the second storage node that an associated entry has been invalidated. If a read request is received by the second storage node, while the write request is still pending, the read request is processed by the first storage node. Once the data is modified, the second storage node adds an entry to the R-SLC for processing any read requests received after the data is modified.

In another aspect, the technology disclosed herein provides a solution for different race conditions that may arise due to the use of the R-SLC in the first and second storage nodes. At a high level, when the second storage node receives a read request for data stored by a first storage node LUN, and an associated entry does not exists at the R-SLC of the second storage node, then a dummy entry is created by the second storage end for the requested data. The term dummy entry in this context means an entry that is temporary and will not be used to respond to read requests until the entry is finalized and committed. The second storage node sends the read request to the first storage node. If the first storage node also receives a write request to modify the same data requested by the read request, then the first storage node sends an invalidation request to the second storage node. In response to the invalidation request, the second storage node invalidates the dummy entry. The second storage node may also receive a response to the read request with old data since the write request may still be pending. The second node updates the dummy entry with a storage location entry and invalidates that entry, since the requested data may still be in the process of being modified. This prevents the second storage node from sending out stale data. Other race conditions and associated solutions provided by this disclosure are described below in detail.

In one aspect, R-SLC operations may be disabled, e.g., if a request to invalidate an R-SLC entry may not have been received by the remote node (e.g. the second storage node) or a response to the invalidate request is not received by the LON (e.g., the first storage node). The LON transmits an invalidation request to the remote node upon receiving a write request. If a response to the invalidation request is not received within a time "T", then the LON updates a memory structure that tracks sending a heartbeat message to the remote node. The LON sets an indicator to notify the remote node to disable the R-SLC. When a next heartbeat message is sent to the remote node, it includes an indicator to disable the R-SLC.

If the remote node receives the heartbeat message, it disables the R-SLC, or if the remote node does not receive any heartbeat message for a certain duration, then the remote node disables the R-SLC. After the R-SLC is disabled, any pending invalidation requests are executed, before the R-SLC is enabled, as described below in detail.

In yet another aspect, to improve processing times for read requests, a read ahead operation is executed. When a read request is received by a remote node for data stored by the LON, data that is likely to read is read ahead by the remote node based on a predicted read pattern. The prediction can be made by the remote node. In another aspect, the LON makes the prediction and provides storage information for the data that is likely to be read so that the remote node can read ahead the predicted data, as described below in detail.

As a preliminary note, the terms "component", "module", "system," and the like as used herein are intended to refer to a computer-related entity, either software-executing general-purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, storage class memory, solid state drive, EEPROM (electrically erasable programmable read only memory), memory stick or any other storage device type, in accordance with the claimed subject matter.

System 100: FIG. 1A shows an example of a networked storage environment 100 (also referred to as system 100), for implementing the various adaptive aspect of the present disclosure. System 100 may include a plurality of computing devices 102A-102N (may also be referred to as a "host system 102," "host systems 102", "computing device 102", "computing devices 102", "server 102" or "servers 102") communicably coupled via a connection system 110 (e.g. a local area network (LAN), wide area network (WAN), the Internet and others) to a storage system 108 (may also be referred to as "storage server 108", "storage controller 108", "storage node 108", "storage nodes 108", "storage system node 108" or "storage system nodes 108") that executes a storage operating system 134 for storing and retrieving data to and from a storage subsystem 112 having mass storage devices 118. In one aspect, the storage sub-system 112 is a SAN based array. Although only a single storage system 108 is shown in FIG. 1A, according to aspects of the present disclosure, system 100 includes a plurality of storage systems 108 arranged in one or more high-availability pairs (see FIG. 1B). As used herein, the term "communicably coupled" may refer to a direct connection, a network connection, or other connections to enable communication between devices.

As an example, host system 102A may execute a plurality of virtual machines (VMs) in a virtual environment that is described below in detail. Host 102N may execute one or more application 126, for example, a database application, an email application or any other application type that uses the storage system 108 to store information in storage devices 118. Host 102N executes an operating system 114, for example, a Windows based operating system, Linux, Unix and others (without any derogation of any third-party trademark rights) to control the overall operations of host 102N.

Clients 116A-116N are computing devices that can access storage space at the storage system 108 via the connection system 110. A client can be the entire system of a company, a department, a project unit or any other entity. Each client is uniquely identified and, optionally, may be a part of a logical structure called a storage tenant 140. The storage tenant 140 represents a set of users (may be referred to as storage consumers) for a storage provider 124 (may also be referred to as a cloud manager, where cloud computing is utilized) that provides access to storage system 108. It is noteworthy that the adaptive aspects of the present disclosure are not limited to using a storage provider or a storage tenant, and instead, may be implemented for direct client access.

In one aspect, the storage operating system 134 has access to mass storage devices 118 of storage subsystem 112. The mass storage devices 118 may include solid state drives (SSDs), storage class memory, writable storage device media such as hard disk drives (HDD), magnetic disks, video tape, optical, DVD, magnetic tape, and/or any other similar media adapted to store electronic information. The storage devices 118 may be organized as one or more groups of Redundant Array of Independent (or Inexpensive) Disks (RAID). The various aspects disclosed are not limited to any specific storage device type or storage device configuration.

As an example, the storage operating system 134 may provide a set of logical storage volumes (or logical units (LUNs)) that present storage space to host systems 102, clients 116, and/or VMs (e.g., 130A/130N, described below) for storing information. Each volume may be configured to store data containers (e.g. files, directories, structured or unstructured data, or data objects), scripts, word processing documents, executable programs, and any other type of structured or unstructured data. From the perspective of one of the client systems, each volume can appear to be a single drive. However, each volume can represent storage space at one storage device, an aggregate of some or all the storage space in multiple storage devices, a RAID group, or any other suitable set of storage space.

An example of storage operating system 134 is the Data ONTAP® storage operating system available from NetApp, Inc. that implements a Write Anywhere File Layout (WAFL®) file system, (without derogation of any trademark rights of NetApp Inc.). The various aspects disclosed herein are not limited to any specific file system type and maybe implemented by other file systems and storage operating systems.

The storage operating system 134 organizes storage space at the storage subsystem 112 as one or more "aggregate," where each aggregate is identified by a unique identifier and a location. Within each aggregate, one or more storage volumes are created whose size can be varied. A qtree, sub-volume unit may also be created within the storage volumes. As a special case, a qtree may be an entire storage volume.

The storage system 108 may be used to store and manage information at storage devices 118. A request to store or read data may be based on different protocols, for example, iSCSI (Internet Small Computer Systems Interface) and SCSI encapsulated over Fibre Channel (FCP) for SAN based storage, the Common Internet File System (CIFS) protocol or Network File System (NFS) protocol, over TCP/IP (Transmission Control Protocol/Internet Protocol). The term file/files as used herein include data container/data containers, directory/directories, and/or data object/data objects with structured or unstructured data.

Figure 2A:
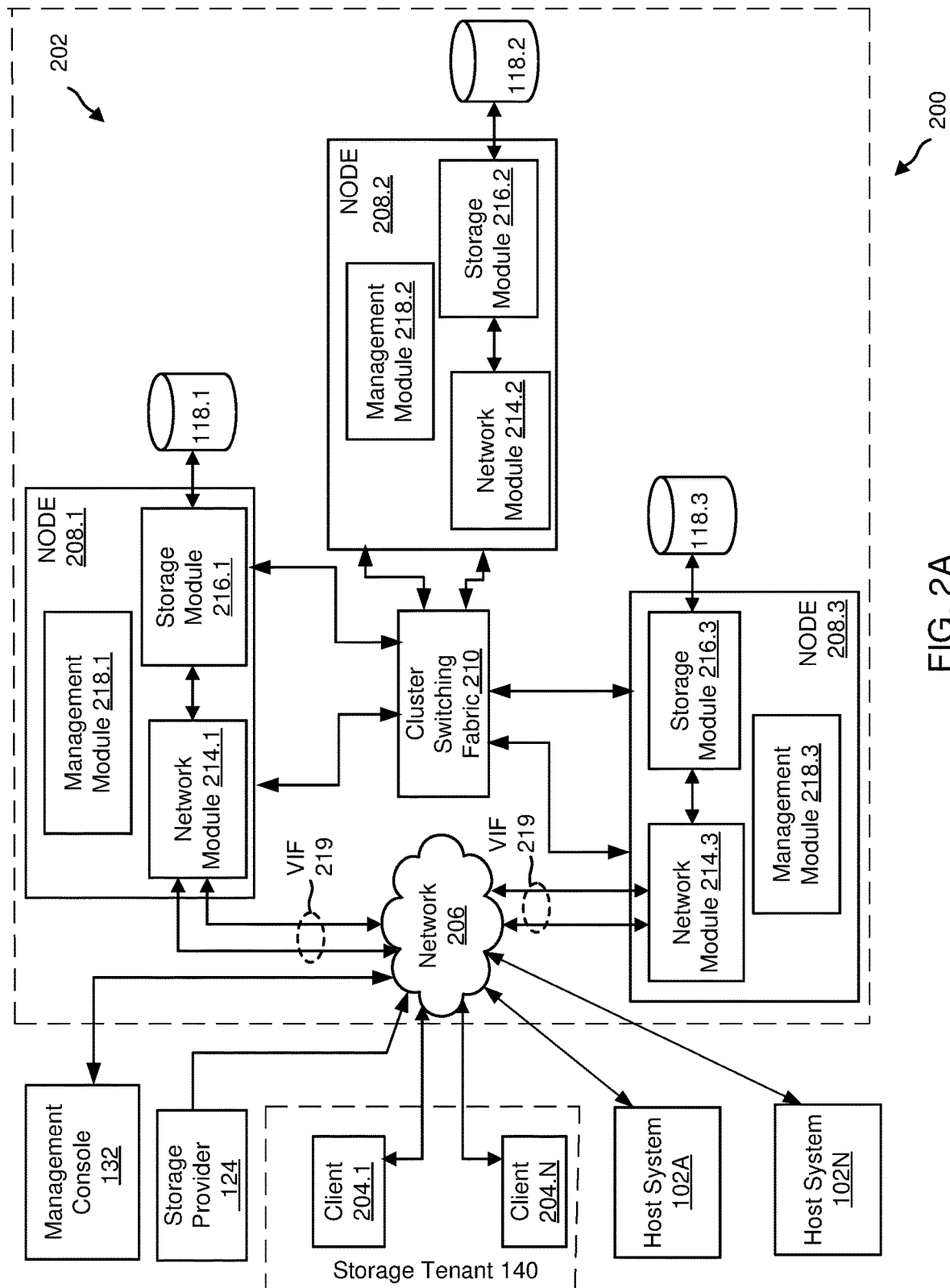
FIG. 2A shows an example of a clustered storage system with a plurality of storage system nodes, used according to aspects of the present disclosure.
Figure 2B:
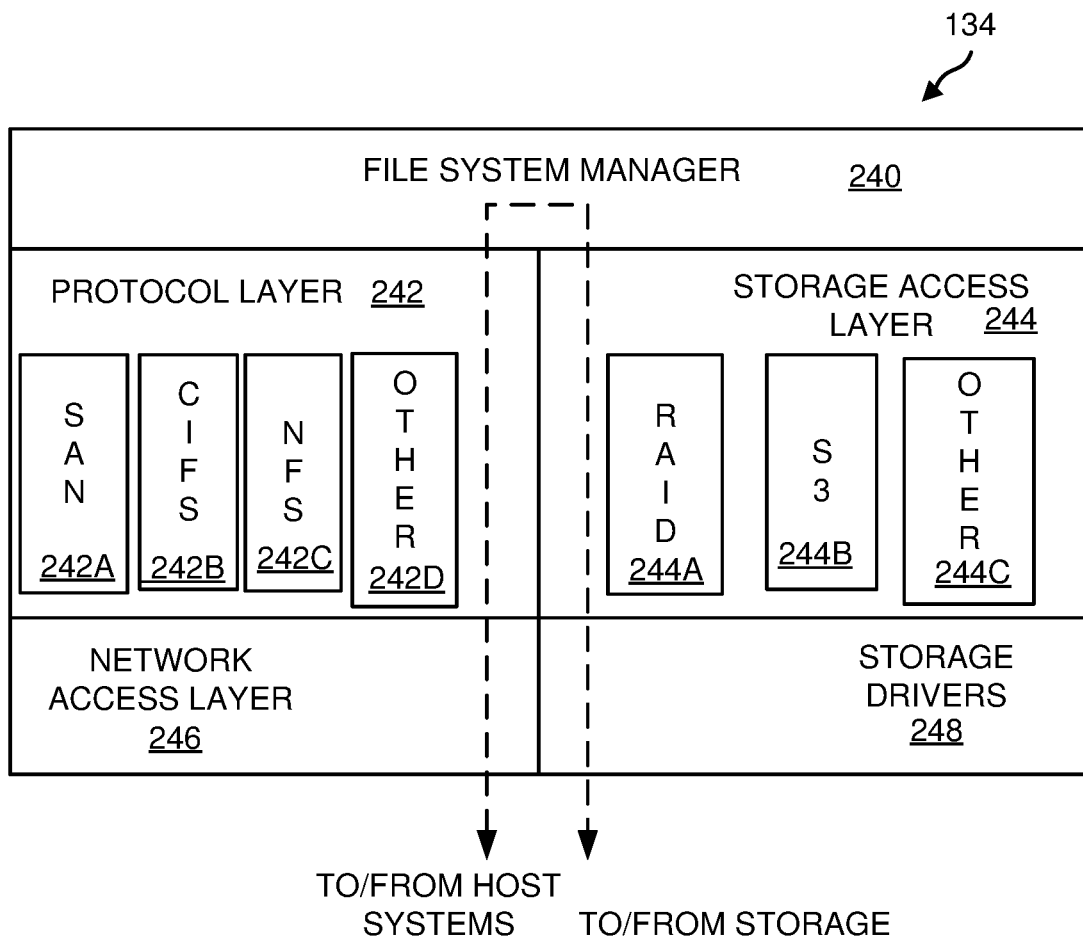
FIG. 2B shows an example of a storage operating system executed by a storage system node, according to aspects of the present disclosure.

To facilitate access to storage space, the storage operating system 134 implements a file system (also referred to as file system manager e.g. the file system manager 240, shown in FIG. 2B) that logically organizes stored information as a hierarchical structure for files/directories/objects at the storage devices. Each "on-disk" file may be implemented as a set of data blocks configured to store information. The data blocks are organized within a volume block number (VBN) space that is maintained by the file system, described below in detail. The file system may also assign each data block in the file a corresponding "file offset" or file block number (FEN). The file system typically assigns sequences of FENS on a per-file basis, whereas VBNs are assigned over a larger volume address space. The file system organizes the data blocks within the YEN space as a logical volume. The file system typically consists of a contiguous range of VBNs from zero to n, for a file system of site n−1 blocks.

The storage operating system 134 may further implement a storage module (for example, a RAID system for the storage subsystem 112) that manages the storage and retrieval of the information to and from storage devices 118 in accordance with input/output (I/O) operations. When accessing a block of a file in response to servicing a client request, the file system specifies a VBN that is translated at the file system/RAID system boundary into a disk block number ("DBN") (or a physical volume block number ("PVBN") location on a particular storage device (storage device, DBN) within a RAID group of the physical volume). Each block in the VBN space and inn the DEN space is typically fixed, e.g., 4 k bytes (kB), in size; accordingly, there is typically a one-to-one mapping between the information stored on the storage devices in the DEN space and the information organized by the file system in the VBN space.

A requested block is retrieved from one of the storage devices 118 and stored in a buffer cache (e.g. 140, FIG. 1E) of a memory of the storage system 108 as part of a buffer tree (e.g. 400, FIG. 4) of the file. The buffer tree is an internal representation of blocks for a file stored in the buffer cache and maintained by the file system. Broadly stated and as described below in detail, the buffer tree has an inode at the root (top-level) of the file, as described below.

An inode is a data structure used to store information, such as metadata, about a file, whereas the data blocks are structures used to store the actual data for the file. The information in an inode may include, e.g., ownership of the file, file modification time, access permission for the file, size of the file, file type and references to locations on storage devices 118 of the data blocks for the file. The references to the locations of the file data are provided by pointers, which may further reference indirect blocks (e.g. 404, FIG. 4) that, in turn, reference the data blocks (e.g. 406, FIG. 4), depending upon the amount of data in the file. Each pointer may be embodied as a VBN to facilitate efficiency among the file system and the RAID system when accessing the data.

Volume information ("volinfo") and file system information ("fsinfo") blocks specify the layout of information in the file system, the latter block including an inode of a file that includes all other inodes of the file system (the inode file). Each logical volume (file system) has an fsinfo block that is preferably stored at a fixed location, e.g., at a RAID group. The inode of the fsinfo block may directly reference (or point to) blocks of the inode file or may reference indirect blocks of the inode file that, in turn, reference direct blocks of the inode file. Within each direct block of the inode file are embedded inodes, each of which may reference indirect blocks that, in turn, reference data blocks (also mentioned as "L0" blocks) of a file. An example of an inode and a buffer tree are described below with respect to FIG. 4.

In a typical mode of operation, a computing device (e.g. host system 102, client 116 or any other device) transmits one or more I/O requests over connection system 110 to the storage system 108. Storage system 108 receives the I/O requests, issues one or more I/O commands to storage devices 118 to read or write data on behalf of the computing device, and issues a response containing the requested data over the network 110 to the respective client system.

As mentioned above, system 100 may also include a virtual machine environment where a physical resource is time-shared among a plurality of independently operating processor executable virtual machines (VMs). Each VM may function as a self-contained platform, running its own operating system (OS) and computer executable application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host system) which may be referred to herein as "host hardware resources". The host hardware resources may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

As shown in FIG. 1A, host system 102A includes/provides a virtual machine environment executing a plurality of VMs 130A-130N (also referred to as VM 130 or VMs 130) that may be presented to client computing devices/systems 116A-116N. VMs 130 execute a plurality of guest OS 104A-104N (may also be referred to as guest OS 104) that share hardware resources 128. Application 126 may also be executed within VMs 130 to access the storage system 108. As described above, hardware resources 128 may include storage, CPU, memory, I/O devices or any other hardware resource.

In one aspect, host system 102A interfaces with or includes a virtual machine monitor (VMM) 106, for example, a processor executed Hyper-V layer provided by Microsoft Corporation of Redmond, Wash., a hypervisor layer provided by VMWare Inc., or any other type (without derogation of any third party trademark rights). VMM 106 presents and manages the plurality of guest OS 104A-104N executed by the host system 102A. The VMM 106 may include or interface with a virtualization layer (VIL) 122 that provides one or more virtualized hardware resource to each OS 104A-104N.

In one aspect, VMM 106 is executed by host system 102A with VMs 130. In another aspect, VMM 106 may be executed by an independent stand-alone computing system, referred to as a hypervisor server or VMM server and VMs 130 are presented at one or more computing systems.

It is noteworthy that different vendors provide different virtualization environments, for example, VMware Corporation, Microsoft Corporation and others. Data centers may have hybrid virtualization environments/technologies, for example, Hyper-V and hypervisor based virtual environments. The generic virtualization environment described above with respect to FIG. 1A may be customized to implement the various aspects of the present disclosure. Furthermore, VMM 106 (or VIL 122) may execute other modules, for example, a storage driver, network interface and others. The virtualization environment may use different hardware and software components and it is desirable for one to know an optimum/compatible configuration.

In one aspect, system 100 uses a management console 132 for configuring and managing the various components of system 100. As an example, the management console 132 may be implemented as or include one or more application programming interfaces (APIs) that are used for managing one or more components of system 100. The APIs may be implemented as REST APIs, where REST means "Representational State Transfer". REST is a scalable system used for building web services. REST systems/interfaces may use HTTP (hyper-text transfer protocol) or other protocols for communicating with one or more devices of system 100.

Although storage system 108 is shown as a stand-alone system, i.e. a non-cluster based system, in another aspect, storage system 108 may have a distributed architecture; for example, a cluster based storage system that is described below in detail with respect to FIG. 2A.

Figure 1B:
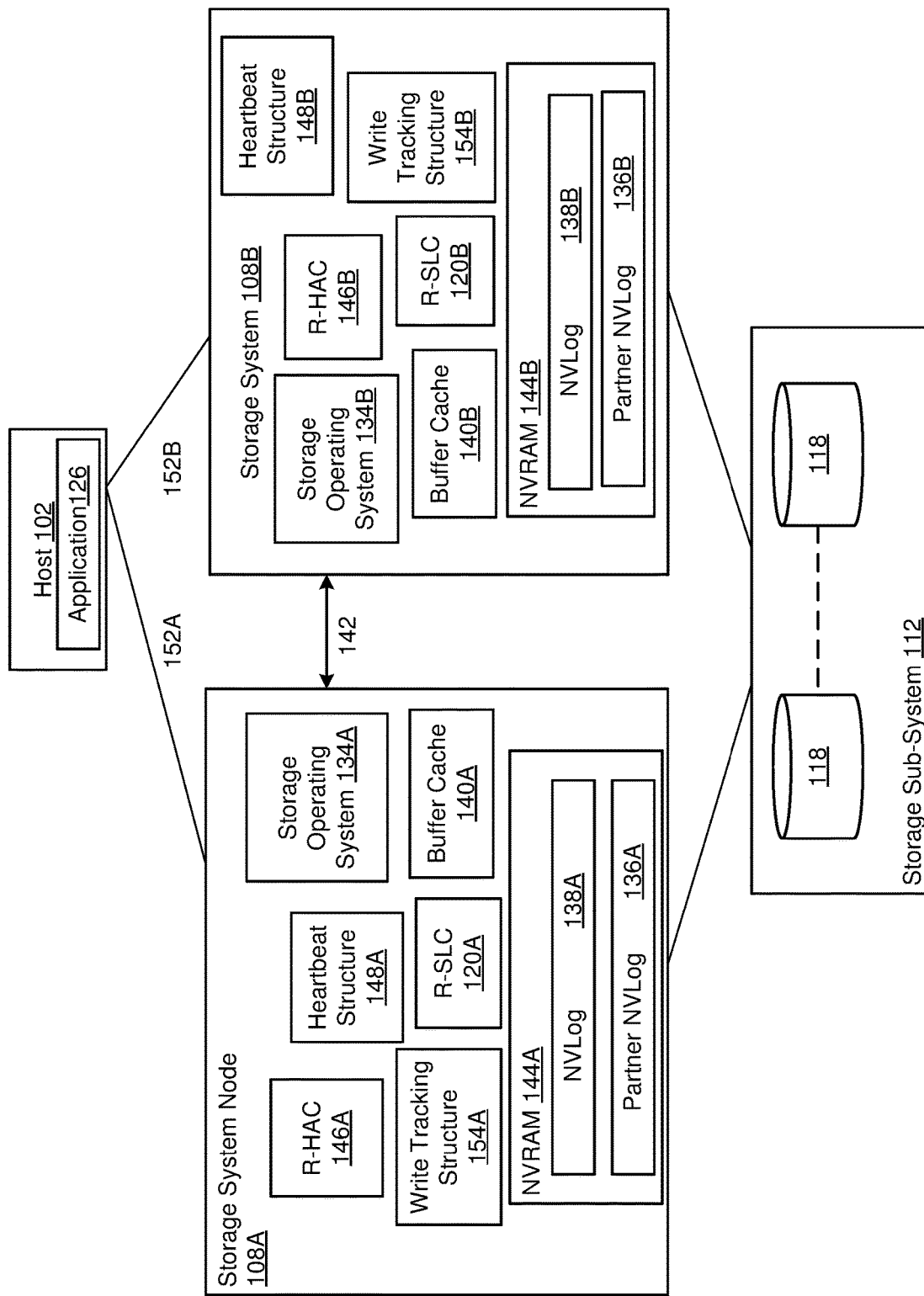
FIG. 1B shows an example of two storage system nodes operating as partner nodes, according to aspects of the present disclosure.

Partner Nodes:

FIG. 1B shows an example of storage system nodes (also referred to as storage nodes or nodes) 108A/108B connected by a link 142 (e.g. a network communication link or any other interconnect type) configured to operate as partner nodes for a host system 102 (or client 116, FIG. 1A). Each storage system node 108A/108B executes the storage operating system 134 (shown as 134A for the storage system node 108A, and 134B for the storage system node 108B). The storage operating system 134 uses a volatile, buffer cache 140 (shown as buffer cache 140A for storage system 108A, and buffer cache 140B for storage system 140B) for managing write and read requests.

As an example, application 126 executed by the host system 102 can access storage at the storage sub-system 112. For example, a LUN presented to the application 126 by the storage system node 108A is used to store data at the storage sub-system 112. Since the LUN is presented by the storage system node 108A, it is referred to as a LUN Owning Node ("LON"). In this example, the storage system node 108B can be referred to as the remote node or the non-LON. When the storage system node 108B presents or owns a LUN, then the storage system node 108B operates as the LON for the LUN it owns/presents.

To read data from the storage sub-system 112, host 102 may send read requests using both network paths 152A/152B, depending on the load balancing needs of host 102 and/or the bandwidth availability of paths 152A/152B. In conventional systems, the non-LON typically forwards all the read requests to the LON using link 142. This can cause latency in processing the read requests, because the LON provides the requested data, and the non-LON then sends a response to the host 102. This is especially undesirable when the storage sub-system 112 is used as SAN based storage and latency can impact performance of reading and writing data. The present disclosure solves this technical challenge with innovative technology, as described below.

In one aspect, each storage system node maintains a remote storage location cache (R-SLC) 120 (i.e. 120A maintained by the storage system node 108A and 120B maintained by the storage system node 108B). The R-SLC 120 is configured to enable the non-LON to directly respond to most read requests without having to forward them to the LON, as described below in detail. The R-SLC 120 stores the storage location (e.g., PVBN) of data that is stored using the LON. An entry for the R-SLC indicating the storage location of requested data is generated when a read request is received by the non-LON, as described below in detail.

In addition to the R-SLC 120, each node also maintains a remote hash structure, R-HAC 146 (i.e., 146A by the storage system node 108A and 146B by the storage system node 108B). Entries to the R-HAC 146 can be created on demand, i.e. when an input/output (I/O) request (i.e. read or write request) is received by the non-LON for a LON. The R-HAC 146 is configured to store inode attributes of remote LUNs. The attributes are updated, when LUN attributes change, e.g. a LUN is expanded in size or decreased. Details of using R-HAC 146 are provided below.

In another aspect, each node also maintains a heartbeat memory structure (shown as heartbeat structure) 148 (i.e. the storage system node 108A maintains the heartbeat structure 148A and the storage system node 108B maintains the heartbeat structure 148B) to disable and enable the use of the R-SLC at the non-LON, as described below in detail. A typical heartbeat message is used to ensure that the partner node is available and operating. The innovative structure described herein disables and enables the use of R-SLC 120 based on the state of the heartbeat structure.

In yet another aspect, based on a read request pattern, the LON and/or the non-LON predicts what data may be read in the future. Entries for the predicted data are created in the R-SLC for the remote node. The read ahead process is described below in detail.

In another aspect, a write tracking structure 154A/154B is maintained by the storage system nodes 108A/108B, respectively. This structure is used to manage certain race conditions that may occur when R-SLC 120A/120B are being used, as described below in detail.

In the foregoing examples, although R-SLC 120, R-HAC 146, the heartbeat structure 148, and the write tracking structure 154 are shown as separate structures, they may be integrated into one or more structures.

To protect against failures, each storage system node also uses a non-volatile random access memory (NVRAM) 144 (shown as NVRAM 144A for the storage system node 108A, and NVRAM 144B for the storage system node 108B) that persistently stores a log, referred to as "NVLog", to track each write operation that is being processed by the buffer cache 140 of each storage system node at any given time. For example, NVLog 138A tracks all the write operations that are buffered in buffer cache 140A of storage system node 108A. A partner NVLog 136A tracks all the write operations that are being processed by the partner storage system node 108B at buffer cache 140B. Similarly, the NVLog 138B tracks all the write operations that are buffered in buffer cache 140B, and the partner NVLog 136B tracks all the write operations of buffer cache 140A that are being processed by the storage system node 108A at any given time. Although for clarity, NVLogs 138A/138B and partner NVLogs 136A/136B are shown as separate logical structures within NVRAMs 144A/144B, the adaptive aspects of the present disclosure maybe implemented by maintaining a single NVLog at each storage system node to track the write operations processed by each node.

During a failover operation, before the storage volumes of a failed storage system node (e.g. 108A) can be made available to incoming read and write requests, a partner storage system node (e.g. 108B) replays (i.e. processes) all the entries mirrored in the partner NVLog 136B to ensure that all the mirrored write requests at the time of failure are executed.

Clustered Storage System:

Before describing the various aspects of the present disclosure, the following describes a clustered based networked storage environment. FIG. 2A shows a cluster-based storage environment 200 having a plurality of storage system nodes operating to store data on behalf of clients at storage subsystem 112. The various storage system nodes may be configured to operate as partner nodes, described above with respect to FIG. 1B.

Storage environment 200 may include a plurality of client systems 204.1-204.N (may also be referred to as "client system 204" or "client systems 204") as part of or associated with storage tenant 140, a clustered storage system 202 (similar to storage system 108) and at least a network 206 communicably connecting the host system 102A-102N, client systems 204.1-204.N, the management console 132, the storage (or cloud) provider 124 and the clustered storage system 202. It is noteworthy that these components may interface with each other using more than one network having more than one network device.

The clustered storage system 202 includes a plurality of storage system nodes 208.1-208.3 (also referred to as "node 208" or "nodes 208"), a cluster switching fabric 210, and a plurality of mass storage devices 118.1-118.3 (similar to 118, FIG. 1A). The nodes 208.1-208.3 can be configured as high-availability pair nodes to operate as partner nodes, as shown in FIG. 1B. For example, node 208.1 and 208.2 may operate as partner nodes. If node 208.1 fails, node 208.2 takes over the storage volumes that are exposed by node 208.1 during a failover operation.

Each of the plurality of nodes 208.1-208.3 is configured to include a network module, a storage module, and a management module, each of which can be implemented as a processor executable module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enable the respective nodes 208.1-208.3 to connect to one or more of the host systems 102A-102N, and the client systems 204.1-204.N (or the management console 132) over the computer network 206. The network modules 214.1-214.3 handle file network protocol processing (for example, CFS, NFS and/or iSCSI requests). The storage modules 216.1-216.3 connect to one or more of the storage devices and process I/O requests. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices, such as storage devices 118.1-118.3.

A switched virtualization layer including a plurality of virtual interfaces (VIFs) 219 is provided to interface between the respective network modules 214.1-214.3 and the client systems 204.1-204.N, allowing storage space at the storage devices associated with the nodes 208.1-208.3 to be presented to the client systems 204.1-204.N as a single shared storage pool.

The clustered storage system 202 can be organized into any suitable number of storage virtual machines (SVMs) (may be referred to as virtual servers (may also be referred to as "SVMs")), in which each SVM represents a single storage system namespace with separate network access. A SVM may be designated as a resource on system 200. Each SVM has a client domain and a security domain that are separate from the client and security domains of other SVMs. Moreover, each SVM is associated with one or more VIFs 219 and can span one or more physical nodes, each of which can hold one or more VIFs 219 and storage associated with one or more SVMs. Client systems can access the data on a SVM from any node of the clustered system, through the VIF(s) 219 associated with that SVM.

Each of the nodes 208.1-208.3 is defined as a computing system to provide services to one or more of the client systems 204.1-204.N and host systems 102A-102N. The nodes 208.1-208.3 are interconnected by the switching fabric 210, which, for example, may be embodied as a Gigabit Ethernet switch or any other type of switching/connecting device.

Although FIG. 2A depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules. In another aspect, the clustered storage system 202 may only include one network module and storage module.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Storage Operating System:

FIG. 2B illustrates a generic example of the storage operating system 134 of FIG. 1A executed by the storage system node 108 (or nodes 208.1-208.3, FIG. 2A), according to one aspect of the present disclosure. In one example, storage operating system 134 may include several modules, or "layers" executed by one or both of network module 214 and storage module 216. These layers include a file system manager 240 that keeps track of a hierarchical structure of the data stored in storage devices 118 and manages read/write operation, i.e. executes read/write operation on storage in response to I/O requests, as described below in detail.

Storage operating system 134 may also include a protocol layer 242 and an associated network access layer 246, to allow node 208.1 to communicate over a network with other systems, such as clients 204.1/204.N. Protocol layer 242 may implement one or more of various higher-level network protocols, such as SAN (e.g. iSCSI) (242A), CIFS (242B), NFS (242C), Hypertext Transfer Protocol (HTTP) (not shown), TCP/IP (not shown) and others (242D).

Network access layer 246 may include one or more drivers, which implement one or more lower-level protocols to communicate over the network, such as Ethernet. Interactions between host systems and mass storage devices are illustrated schematically as a path, which illustrates the flow of data through storage operating system 134.

The storage operating system 134 may also include a storage access layer 244 and an associated storage driver layer 248 to allow storage module 216 to communicate with a storage device. The storage access layer 244 may implement a higher-level storage protocol, such as RAID (244A), a S3 layer 244B to access a capacity tier for object-based storage (not shown), and other layers 244C. The storage driver layer 248 may implement a lower-level storage device access protocol, such as Fibre Channel or SCSI. The storage driver layer 248 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a storage system node, implement data access semantics of a general-purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly attached to a client or host computer. The term "storage system" should therefore be taken broadly to include such arrangements in addition to any subsystems configured to perform a storage function and associated with other equipment or systems. It should be noted that while this description is written in terms of a write any-where file system, the teachings of the present disclosure may be utilized with any suitable file system, including a write in place file system.

Figure 3:
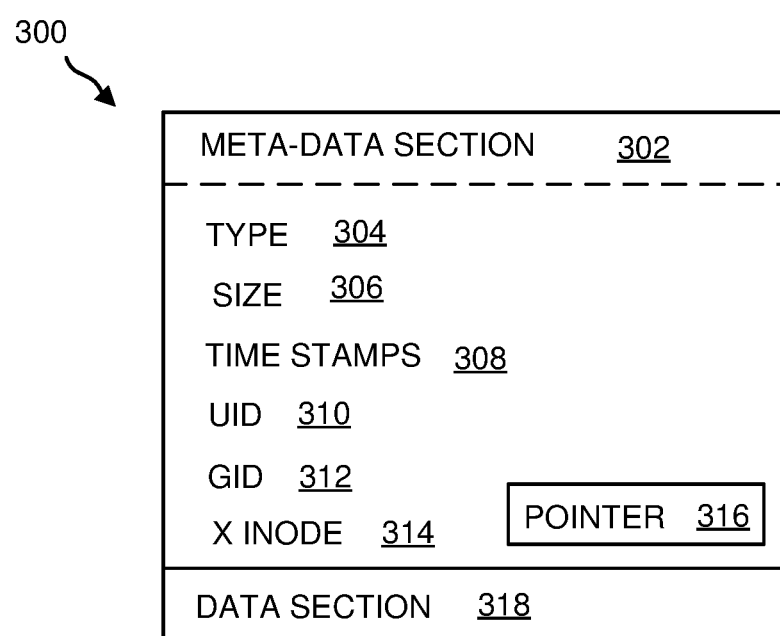
FIG. 3 shows an example of an inode used by a storage system node for storing and retrieving data from a storage device, according to aspects of the present disclosure.

Inode Structure:

FIG. 3 shows an example of an inode structure 300 (may also be referred to as inode 300) used to store data on storage devices 118 of the storage subsystem 112, according to one aspect of the present disclosure. Inode 300 may include a meta-data section 302 and a data section 318. The information stored in the meta-data section 302 of each inode 300 describes a file and, as such, may include the file type (e.g., regular, directory or object) 304, size 306 of the file, time stamps (e.g., access and/or modification time) 308 for the file and ownership, i.e., user identifier (UID 310) and group ID (GID 312), of the file. The metadata section 302 may also include an X-inode field 314 with a pointer 316 that references another on-disk inode structure containing, e.g., access control list (ACL) information associated with the file or directory.

The contents of data section 318 of each inode 300 may be interpreted differently depending upon the type of file (inode) defined within the type field 304. For example, the data section 318 of a directory inode structure includes meta-data controlled by the file system, whereas the data section of a "regular inode" structure includes user-defined data. In this latter case, the data section 318 includes a representation of the data associated with the file. Data section 318 of a regular on-disk inode file may include user data or pointers, the latter referencing, for example, 4 KB data blocks for storing user data at a storage device.

Inode structure 300 may have a restricted size (for example, 122 bytes). Therefore, user data having a size that is less than or equal to 64 bytes may be represented, in its entirety, within the data section of an inode. However, if the user data is greater than 64 bytes but less than or equal to, for example, 64 kilobytes (KB), then the data section of the inode comprises up to 16 pointers, each of which references a 4 KB block of data stored at a storage device. Moreover, if the size of the data is greater than 64 kilobytes but less than or equal to 64 megabytes (MB), then each pointer in the data section 318 of the inode references an indirect inode that contains 1024 pointers, each of which references a 4 KB data block on disk.

Figure 4:
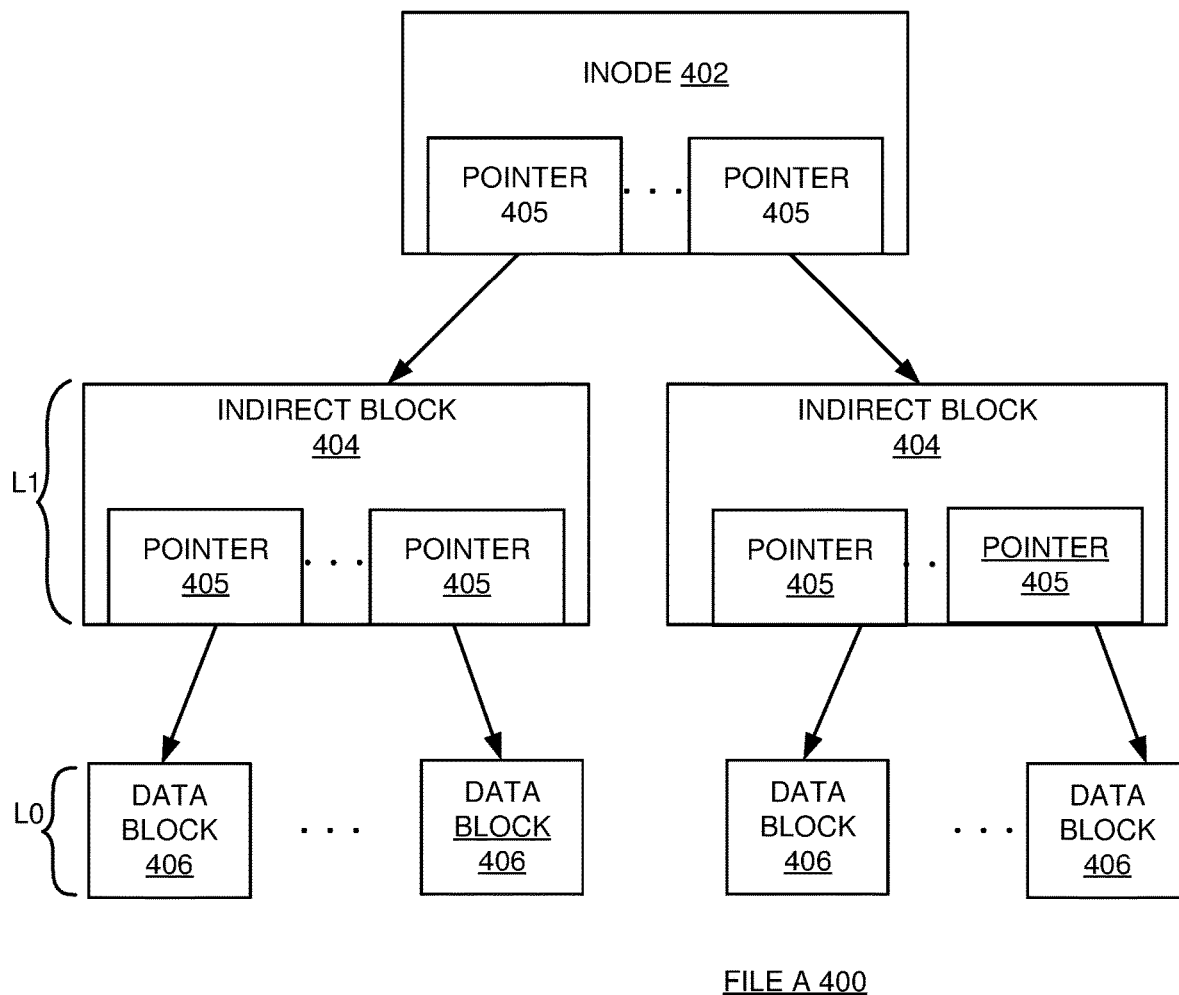
FIG. 4 shows an example of a buffer tree used by a storage operating system of a storage system node, according to aspects of the present disclosure.

Buffer Tree:

FIG. 4 is an example of an inode buffer tree of a data container that may be used by the storage operating system 134. The buffer tree is an internal representation of blocks for a data container (e.g., file A 400) loaded into the buffer cache 140 (e.g., of a storage system node 108 as illustrated in FIG. 1B) and maintained by the file system manager 240. A root (top-level) inode 402, such as an embedded inode, references indirect (e.g., Level 1) blocks 404. The indirect blocks (and inode) contain pointers 405 that ultimately reference data blocks 406 used to store the actual data of file A. That is, the data of file A 400 are contained in data blocks and the locations of these blocks are stored in the indirect blocks of the file. Each Level 1 indirect block 404 may contain pointers to many data blocks.

In one aspect, the file system manager 240 allocates blocks, and frees blocks, to and from a virtual volume (may be referred to as VVOL) of an aggregate. The aggregate, as mentioned above, is a physical volume comprising one or more groups of storage devices, such as RAID groups, underlying one or more VVOLs of the storage system. The aggregate has its own physical volume block number (PVBN) space and maintains metadata, such as block allocation bitmap structures, within that PVBN space. Each VVOL, also has its own virtual volume block number (VVBN) space and maintains metadata, such as block allocation bitmap structures, within that VVBN space. Typically, PVBNs are used as block pointers within buffer trees of files (such as file 400) stored in a VVOL.

As an example, a VVOL may be embodied as a container file in an aggregate having L0 (data) blocks that comprise all blocks used to hold data in a VVOL; that is, the L0 data blocks of the container file contain all blocks used by a VVOL. L1 (and higher) indirect blocks of the container file reside in the aggregate and, as such, are considered aggregate blocks. The container file is an internal (to the aggregate) feature that supports a VVOL; illustratively, there is one container file per VVOL. The container file is a hidden file (not accessible to a user) in the aggregate that holds every block in use by the VVOL.

When operating in a VVOL, VVBN identifies a FBN location within the file and the file system uses the indirect blocks of the hidden container file to translate the FBN into a PVBN location within the physical volume, which block can then be retrieved from storage. In one aspect, the PVBN location is stored within the R-SLC 120 to enable a remote node to process remote read requests, as described below in detail.

Figure 5A:
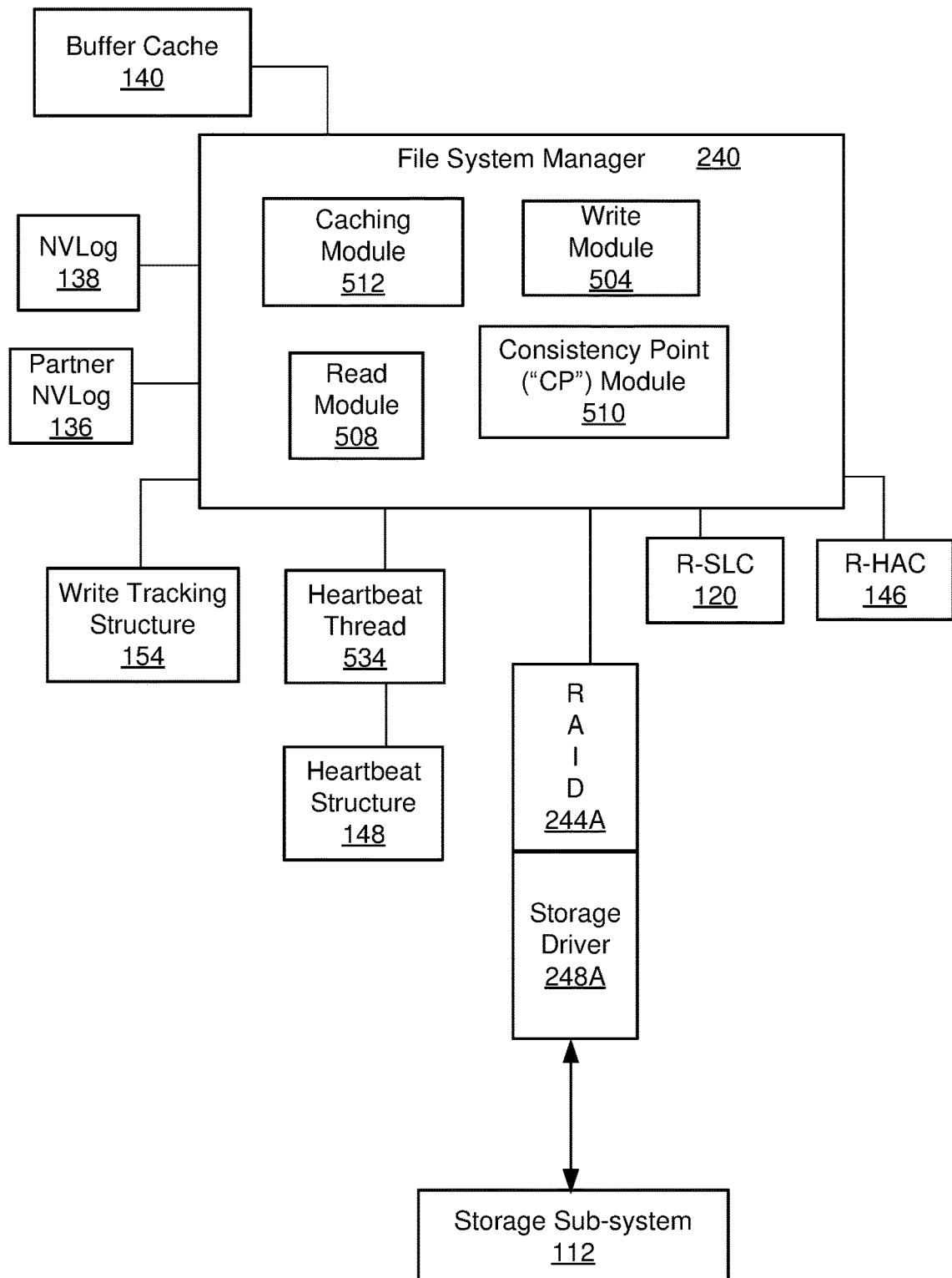
FIG. 5A shows a block diagram of a file system manager of a storage operating system, according to aspects of the present disclosure.

File System Manager 240:

FIG. 5A shows a block diagram of the file system manager 240 (first introduced with respect to FIG. 2B), according to one aspect of the present disclosure. The file system manager 240 includes a write module 504 that manages write requests for writing data in storage device 118 (FIG. 1A) and a read module 508 that manages read requests for reading data from storage devices 118. The buffer cache 140 is managed by a caching module 512. A consistency point (CP) module 510 is used to manage CP operations to flush data from the buffer cache 140 to persistent storage (e.g., storage devices 118). In one aspect, when data is to be persistently stored, the data is marked as dirty at the buffer cache 140, and then the CP module 510 flushes the dirty data from the buffer cache 140 to the storage subsystem 112 e.g., at storage devices 118.

The read module 508 is used to fetch data from the storage devices 118 at the storage subsystem 112 in response to read requests. The RAID layer 244A using a storage driver 248A, for example a Fibre Channel driver, is used to access the storage devices 118 at the storage subsystem 112 to retrieve the requested data and present the data to an application that requested the data.

In one aspect, the file system manager 240 has access to the R-SLC 120, the R-HAC 146, the heartbeat structure 148 (accessed by a heartbeat thread 534) and write tracking structure 154 (accessed and maintained by the write module 504). Details of these various structures and how they are used are provided below.

R-SLC 120, R-HAC 146, Heartbeat Structure 148 and Data Structure 154:

FIG. 5B shows an example of the R-SLC 120 maintained by the partner storage system nodes 108A and 108B at a memory location, according to one aspect of the present disclosure. The R-SLC 120 stores a data container identifier (e.g. a file handle) 502A/502N for each data container that can be directly processed by the remote node that is maintaining the R-SLC, FBN 506A/506N associated with each data container, and a corresponding data container location 514A/514N where data blocks associated with each data container are stored. In one aspect, the storage location 514A/514N includes the PVBN associated with the FBN 506A/506N where data is stored by the storage sub-system 112.

In one aspect, when the remote partner node receives a message from the LON, the message includes a sequence number (e.g., a monotonically increasing sequence number) from the LON. The remote partner node stores the sequence number (e.g., 516A-516N) for each entry in the R-SLC 120. The sequence number is used by the remote partner node to determine if an entry in the R-SLC 120 is stale, as described below in detail.

Furthermore, a transaction identifier 518 (shown as transaction ID 518A-518N) is associated with a read request received by the remote partner node for a LUN owned by the LON, before an entry is added to the R-SLC 120. The read request with the transaction identifier is forwarded to the LON by the remote partner node. A response from the LON to the read request includes the transaction identifier. The remote partner node verifies the transaction identifier before an entry for the data associated with the read request is added to the R-SLC 120 for responding to other read requests for the same data, as described below in detail.

In one aspect, R-HAC 146 is stored at a memory of the storage system nodes 108A and 108B to store inode attributes 522A/522N associated with the remote LUNs (i.e. a LUN owned by the other partner node). The R-HAC 146 entries are generated when an entry to the R-SLC 120 is created. The R-HAC 146 may also include the data container identifiers 502A/502N, a hash identifier 520A/520N based on the FBN 506A/506N and the sequence numbers 516A/516N. The sequence numbers 516A/516N are used to determine if an R-HAC entry is stale. When an inode attribute (e.g., 522A) associated with an entry changes, the LON sends a message with information regarding the changed inode attribute to the remote node with a sequence number, e.g., a monotonically increasing sequence number. The received sequence number for an entry is compared with the stored sequence number. If the received sequence number is greater than the stored sequence number, then the stored entry is discarded and replaced with a new entry with the received sequence number.

In one aspect, attributes 522A include the LUN attributes, e.g., LUN size. If a LUN size is increased by the LON, then the remote node is notified, and the attributes are updated. If a LUN size has to be decreased, the LON notifies the remote node, the remote node updates the LUN size, notifies the LON and then the LON decreases the LUN size.

In another aspect, attributes 522A include inode attributes with information regarding the L1 blocks for a data container and other inode related information that have been described above with respect to FIG. 3. Details of using the R-HAC 146 are provided below.

FIG. 5B further shows the heartbeat structure 148, according to one aspect of the present disclosure. The heartbeat structure 148 is maintained by a heartbeat thread 534 of each storage node. The heartbeat thread 534 of each storage system node 108A and 108B accesses a pair of bits (524 and 526) and (528 and 530) that are used to enable and disable the use of R-SLC 120. One pair, e.g., 524/526 disables and enables R-SLC 120 for one of the nodes, based on a received heartbeat message from the other node, as described below. The second pair, e.g., 528/530 disables and enables R-SLC 120 for the other node based on a received heartbeat message, also described below.

In one aspect, the heartbeat structure 148 is updated using the RDMA (Remote Direct Memory Access) protocol. The RDMA protocol is used to directly write to a memory location by a RDMA enabled network interface (e.g., 712, FIG. 7) without using a node processor.

Figure 5C:
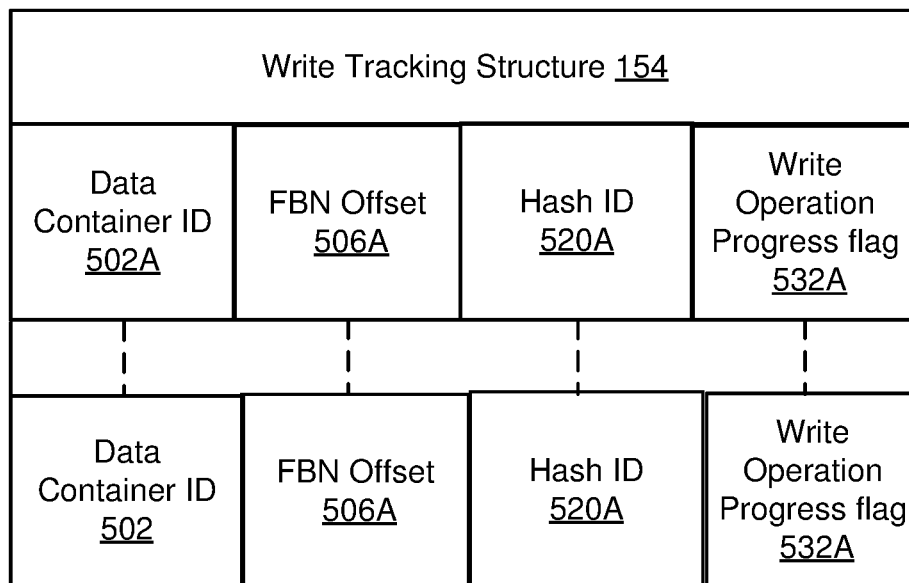
FIG. 5C shows an example of a write tracking data structure to track the progress write operations, according to aspects of the present disclosure.

FIG. 5C shows an example of the write tracking structure 154, according to one aspect of the present disclosure. The write tracking structure 154 is used to track the progress of write operations, as described below in detail. As an example, write tracking structure 154 is stored at a memory location of the storage system nodes 108A and 108B. The write tracking structure 154 entries are generated, e.g., by the write module 504, when a write request is received by a LON. The write tracking structure 154 may include data container identifiers 502A/502N, a hash identifier 520A/520N based on the FBN 506A/506N and a flag 532A/532N that indicates a write operation is in progress. To reduce the overall storage footprint to store the write tracking structure 154, an entry associated with a completed write operation is deleted. Details of using the write tracking structure 154 are provided below.

Figure 6A:
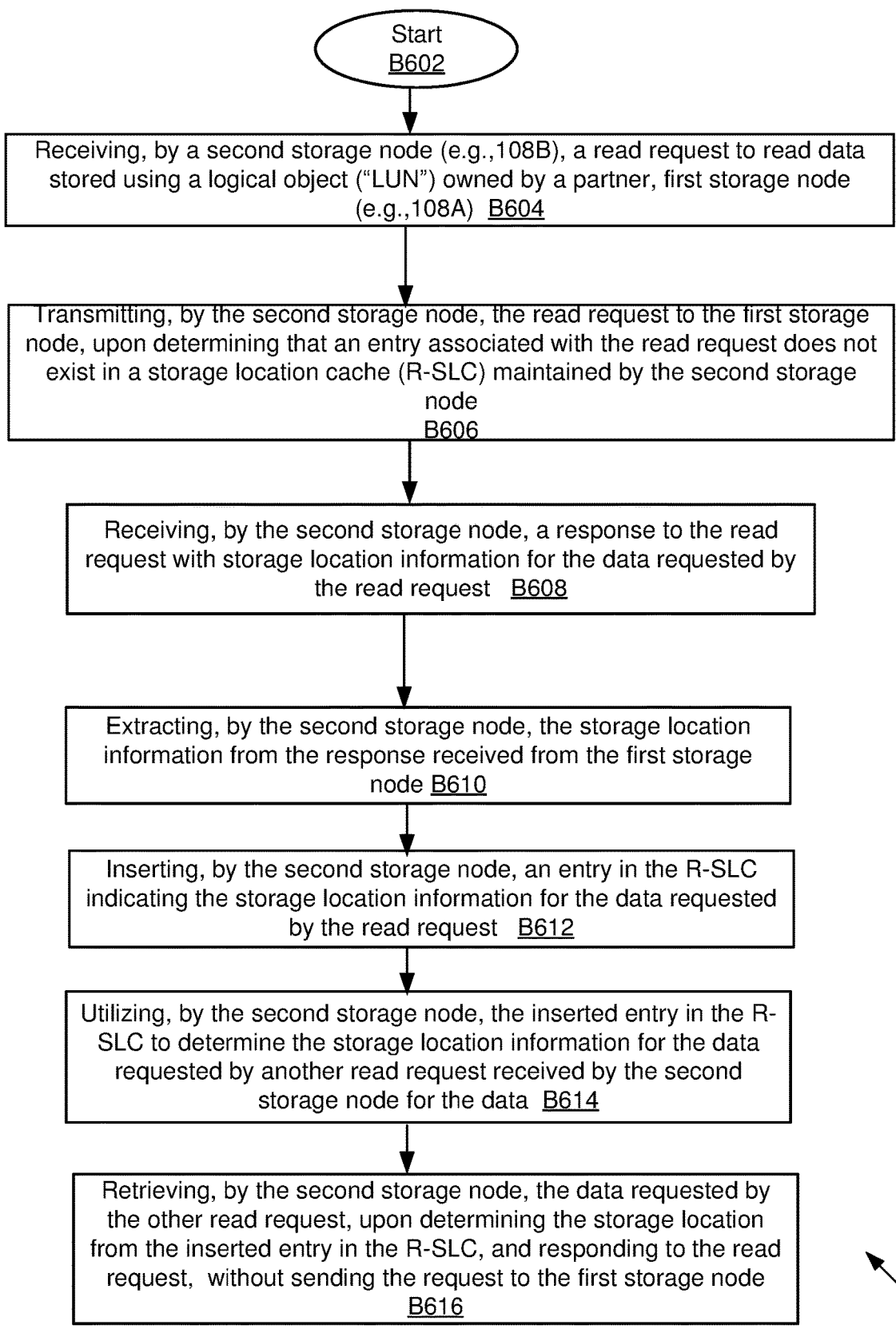
FIG. 6A shows a process for retrieving data for a read request received by a remote node for data stored by a partner node, according to aspects of the present disclosure.

Process 600: FIG. 6A shows a process 600 for using the R-SLC 120, according to one aspect of the present disclosure. Process 600 begins in block B602, when the storage system nodes 108A and 108B have been configured as partner nodes, e.g., by using the management console 132 (FIG. 1A). The examples described below are based on the storage system node 108A being the LON and the storage system node 108B as the remote node i.e., the non-LON node. The adaptive aspects of the present disclosure can be implemented with storage system node 108B as the LON and the storage system node 108A as the non-LON.

In block B604, the remote node 108B receives a read request for data stored by a logical object (LUN) owned by the LON 108A. The request can be received from application 126, VM130, Client 116 or any other entity. The read request may include a data container identifier and an FBN for the requested data.

In block B606, the remote node 108B (e.g., the read module 508) checks the R-SLC 120B to determine if an entry already exists for the data requested by the read request. The remote note 108B scans the R-SLC 120B to find if the data container identifier with the associated FBN exists in an entry at the R-SLC 120B. If an entry does not exist, then the remote node 108B transmits the read request to the LON 108A via link 142 (FIG. 1B).

In block B608, the LON 108A (e.g., the read module 508) retrieves the requested data and prepares a response for the read request. The response includes the requested data and the storage location information for the requested data. The response is transmitted by the LON 108A and received by the remote node 108B.

In block B610, the remote node 108B (e.g., the read module 508) extracts the storage location information from the response received from the LON 108A.

In block B612, the remote node 108B (e.g., the read module 508) inserts an entry in the R-SLC 120B. The entry identifies the data container (502, FIG. 5B), the FBN (506, FIG. 5B) as well as the storage location (514, FIG. 5B) where the requested data is stored. Furthermore, an entry is also inserted in the R-HAC 146 that stores inode attributes for the L1 blocks associated with the requested data (i.e., the L0 blocks). The inode attributes can change and the R-HAC 146 entry is used to ensure the latest attributes are used. If a LUN is deleted, then a message is sent to the remote node 108B so that a corresponding R-HAC 146 entry for the inode can be deleted. Furthermore, if a LUN has been expanded then the remote node 108B is notified. To decrease a LUN size, the remote node 108B is notified, the remote node 108B updates the R-HAC 146 and notifies the LON 108A. Thereafter, the LUN size is decreased by the LON 108A.

In block B614, when another request for the same data as the request of block B604 is received by the remote node 108B, the entry inserted in the R-SLC 120B is used by the remote node 108B to determine the storage location of the requested data. Thereafter, in block B616, the remote node 120B (e.g., the read module 508) retrieves the requested data from the storage location indicated by the R-SLC 120B, without sending the request to the LON 108A. The remote node 108B prepares a response to the read request and sends the requested data to the requesting device/application.

Process 600 technology reduces latency in processing read requests that are received by the non-LON (108B in the above example) for data stored by the LON (108A in the above example). Using the innovative R-SLC 120, the non-LON does not send the read requests to the LON, and instead responds to read requests directly. This saves time which is very desirable for data centers using SAN storage arrays that are accessed by SAN protocols.

Figure 6B:
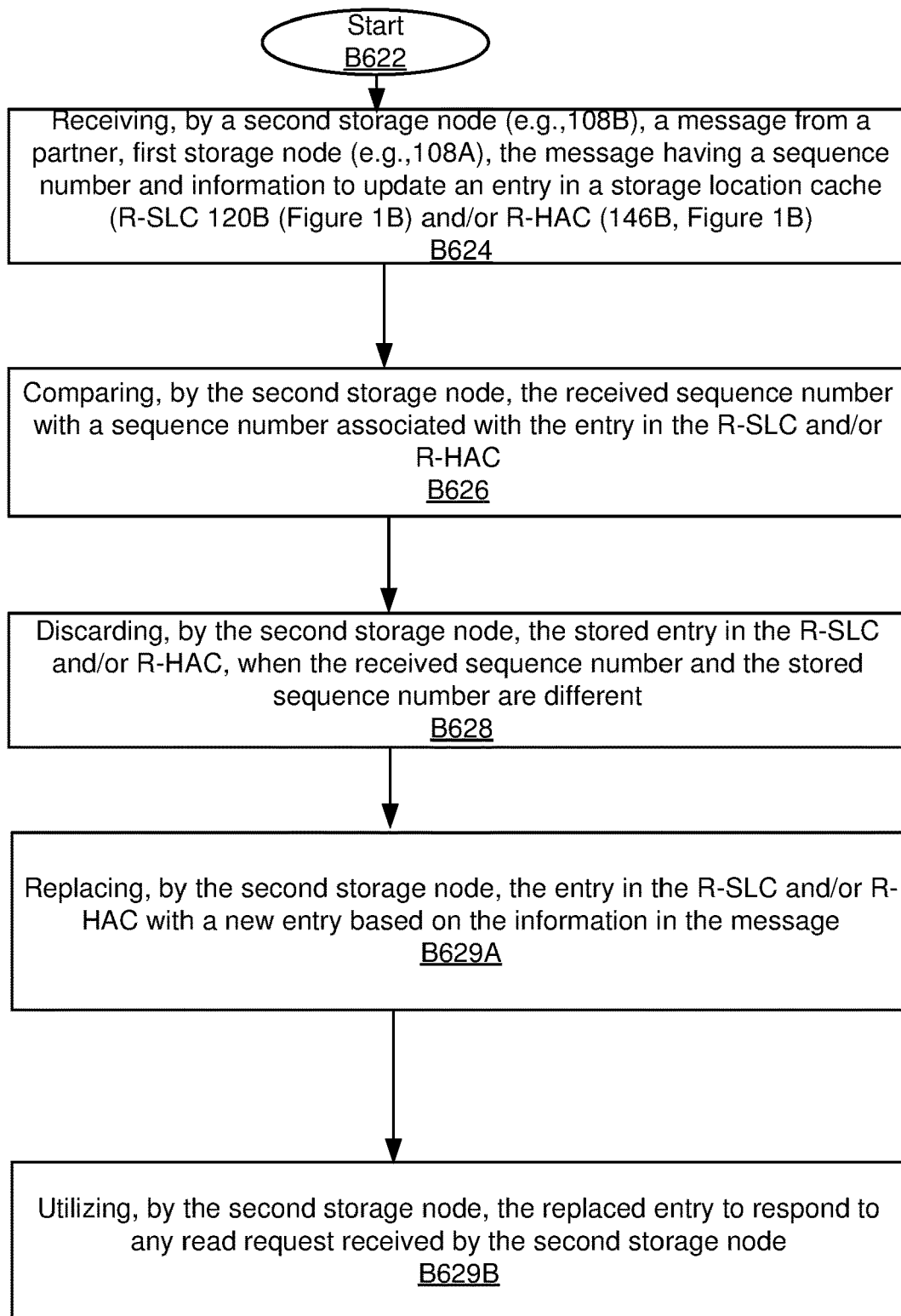
FIG. 6B shows a process for updating a R-SLC and/or R-HAC entry using sequence numbers, according to aspects of the present disclosure.

Process 620: FIG. 6B shows a process 620 for using sequence numbers assigned by a LON, according to one aspect of the present disclosure. Process 620 begins in block B622, when the storage system nodes 108A and 108B have been configured as partner nodes.

e.g., by using the management console 132 (FIG. 1A). The examples described below are based on the storage system node 108A being the LON and the storage system node 108B as the remote node i.e., the non-LON node. The adaptive aspects of the present disclosure can be implemented with storage system node 108B as the LON and the storage system node 108A as the non-LON.

In block B624, the remote note 108B receives a message from the LON 108A. The message includes a sequence number and information regarding an entry in the R-SLC 120B and/or R-HAC 146B (FIG. 1B). As an example, the sequence number is monotonically increasing.

In block B626, the remote node 108B compares the received sequence number with a stored sequence number, associated with the entry in R-SLC 120B and/or R-HAC 146B.

In block B628, the remote node 108B discards the entry from the R-SLC 120B and/or R-HAC 146B, if the received sequence number is higher than the stored sequence number corresponding to the stored entry.

In block B629A, the remote node 108B replaces the entry with a new entry in the R-SLC 120B. The new entry is based on the information included in the message. The new entry is saved with the received sequence number in the message. Furthermore, an entry is also inserted in the R-HAC 146 that stores inode attributes for the L1 blocks associated with the requested data (i.e. the L0 blocks). The inode attributes can change and the R-HAC 146 entry with the received sequence number is used to ensure the latest attributes are used by the remote node 108B.

In block B629B, when a read request for data is received by the remote node 108B, the entry inserted in block B629A is used to determine the storage location of the requested data. The remote node 120B retrieves the requested data from the storage location indicated by the R-SLC 120B, without sending the request to the LON 108A. The remote node 108B prepares a response to the read request and sends the requested data to the requesting device/application.

In one aspect, the remote node 108B uses the sequence number received from the LON 108A to update entries in the R-SLC 120B and R-HAC 146B. Furthermore, the sequence number ensures that stale entries are discarded from the R-SLC 120B and/or R-HAC 146B.

Figure 6C:
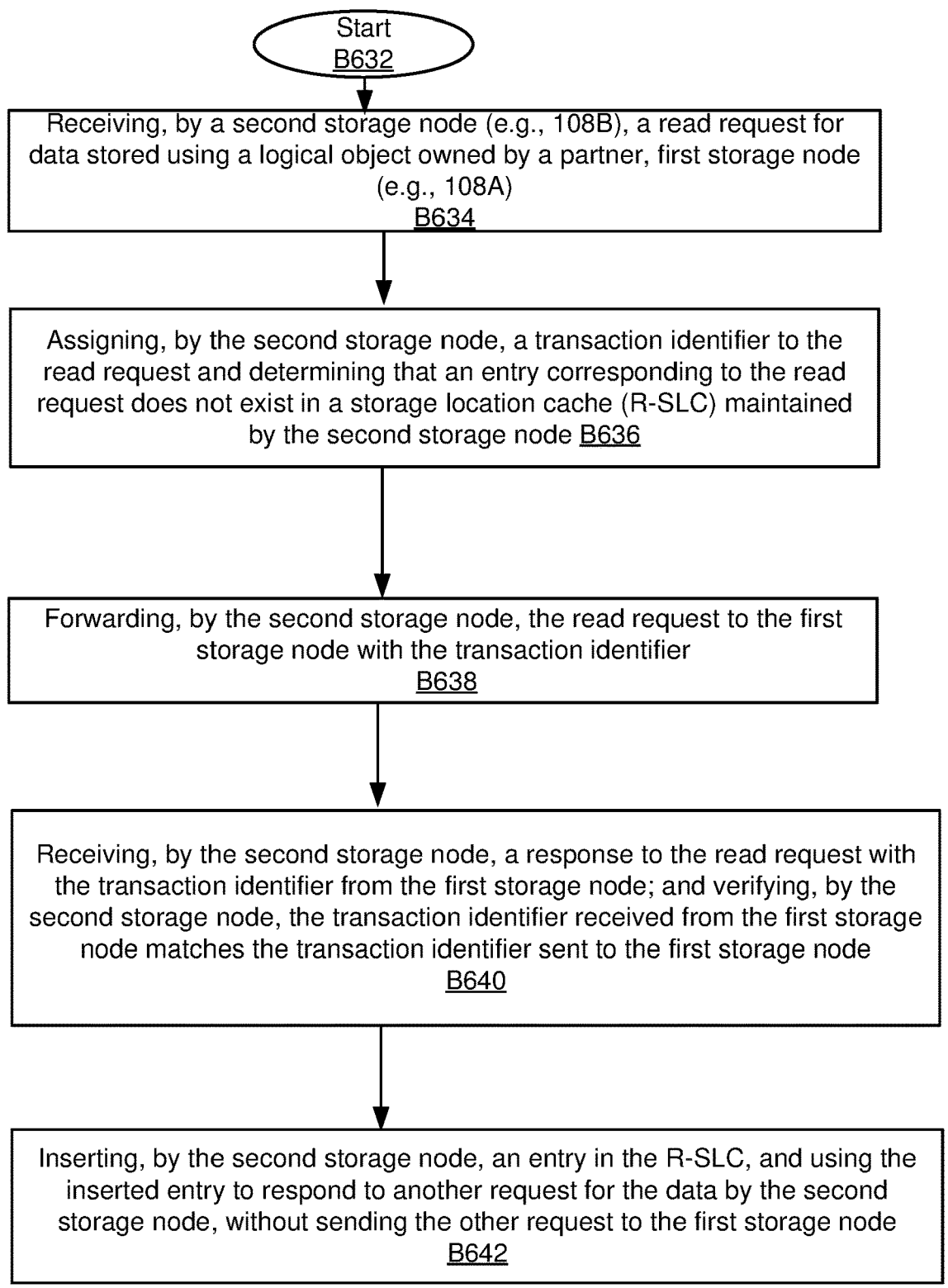
FIG. 6C shows a process for using transaction identifiers by partner nodes, according to aspects of the present disclosure.

Process 630:

FIG. 6C shows a process 630 for using the R-SLC 120 with transaction identifiers, according to one aspect of the present disclosure. Process 630 begins in block B632, when the storage system nodes 108A and 108B have been configured as partner nodes e.g., by using the management console 132 (FIG. 1A). The examples described below are based on the storage system node 108A being the LON and the storage system node 108B as the remote node i.e., the non-LON node. The adaptive aspects of the present disclosure can be implemented with storage system node 108B as the LON and the storage system node 108A as the non-LON.

In block B634, the remote note 108B (e.g., the read module 508) receives a read request for data stored by a logical object (LUN) owned by the LON 108A. The request can be received from application 126, VM130, client 116 or any other entity. The read request may include a data container identifier and an associated FBN.

In block B636, the remote node 108B scans the R-SLC 120B to determine if an entry for the data container identifier/FBN for the requested data exists in the R-SLC 120B. If an entry does not exist, then the remote node 108B assigns a transaction identifier to the read request (e.g., 518A, FIG. 5B). The transaction identifier is intended to ensure that accurate data is received for the read request from LON 108A and an entry can be stored at the R-SLC 120B for the read request data. In block B638, the remote node 108B transmits the read request to the LON 108A with the transaction identifier.

In block B640, the LON 108A prepares a response for the read request. The response includes the requested data, storage location information for the requested data, the transaction identifier received from the remote node 108B in block B638. The response is transmitted by the LON 108A and received by the remote node 108B. The remote node 108B verifies that the transaction identifier in the response from LON 108A matches the transaction identifier transmitted to the LON 108A in block B638.

In block B642, after verifying the transaction identifier, the remote node 108B extracts the storage location information from the response received from the LON 108A. The remote node 108B inserts an entry in the R-SLC 120B. The entry identifies the data container, the FBN and the storage location where the requested data is stored. Furthermore, an entry is inserted in the R-HAC 146 that stores inode attributes for the L1 blocks associated with the requested data (i.e. the L0 blocks). The inode attributes can change and the R-HAC 146 entry is used to ensure the latest attributes are used. If a LUN is deleted, then a message is sent to the remote node 108B so that a corresponding R-HAC entry for the inode can be deleted. Furthermore, if a LUN has been expanded then the remote node 108B is notified. To decrease a LUN size, the remote node 108B is first notified, the remote node 108B updates the R-HAC 146 and notifies the LON 108A of the update. Thereafter, the LUN size is decreased by the LON 108A.

When another request for the same data is received by the remote node 108B, the inserted entry in the R-SLC 120B is used to determine the storage location of the requested data. The remote node 120B retrieves the requested data from the storage location indicated by the R-SLC 120B, without sending the read request to the LON 108A. The remote node 108B prepares a response to the read request and sends the requested data to the requesting device/application.

Process 630 technology also reduces latency in processing read requests that are received by the non-LON (108B in the above example) for data stored by the LON (108A in the above example). Using the innovative R-SLC 120, the non-LON does not send the read requests to the LON, and instead responds to read requests directly. This saves time which is very desirable for data centers using SAN storage arrays that are accessed by SAN protocols. Furthermore, if there are multiple I/O requests for the data requested by the read request of block B634, the transaction identifier ensures that the proper storage location is being entered in the R-SLC 120B.

In one aspect, a method executed by one or more processors is provided. The method includes utilizing (e.g., B606, FIG. 6A), by a first storage node (e.g., 108B, FIG. 1B), a storage location cache (e.g., 120B, FIG. 1B) to determine if an entry associated with a first read request for data stored using a logical object owned by a second storage node (e.g., 108A, FIG. 1B) configured as a failover partner node of the first storage node exists; transmitting (e.g., B606, FIG. 6A), by the first storage node, the first read request to the second storage node; receiving (e.g., B608, FIG. 6A), by the first storage node, a response to the first read request from the second storage node with requested data; extracting (e.g., B610, FIG. 6A), by the first storage node, storage location information for the data indicating a storage location where data is stored by the second storage node; inserting (e.g., B612, FIG. 6A), by the first storage node, an entry in the storage location cache indicating the storage location information for the data; utilizing (e.g., B614, FIG. 6A), by the first storage node, the inserted entry in the storage location cache to determine storage location of data requested by a second read request received by the first storage node; and retrieving (e.g., B616, FIG. 6A), by the first storage node, the data for the second read request from the determined storage location in response to the second read request.

The method also includes assigning (e.g., B624, FIG. 6B) by the second storage node, a sequence number (e.g., 516A, FIG. 5B) to a message sent to the first storage node, the message indicating an update to the entry in the storage location cache; receiving, by the first storage node, the sequence number; comparing (e.g., B626, FIG. 6B), by the first storage node, the received sequence number with a sequence number of the entry stored in the storage location cache; and discarding (e.g., B628, FIG. 6B), by the first storage node, the entry from the storage location cache, when the received sequence number is different from the stored sequence number.

The method further includes generating (e.g., B636, FIG. 6C), by the first storage node, a transaction identifier (e.g., 518, FIG. 5B) associated with the first read request; providing (e.g., B638, FIG. 6C), by the first storage node, the transaction identifier to the second storage node; and verifying (e.g., B640, FIG. 6C), by the first storage node, the transaction identifier in the response received from the second storage node, before inserting the entry in the storage location cache.

The method further includes updating (e.g., B642, FIG. 6C), by the first storage node, an attribute of the logical object, when the attribute is modified by the second storage node; receiving (e.g., B642, FIG. 6C), by the first storage node, notification of an intended reduction in a size of the logical object by the second storage node; and updating (e.g., B642, FIG. 6C), by the first storage node, an entry associated with the logical object to reflect the intended reduction in the size.

Figure 6D:
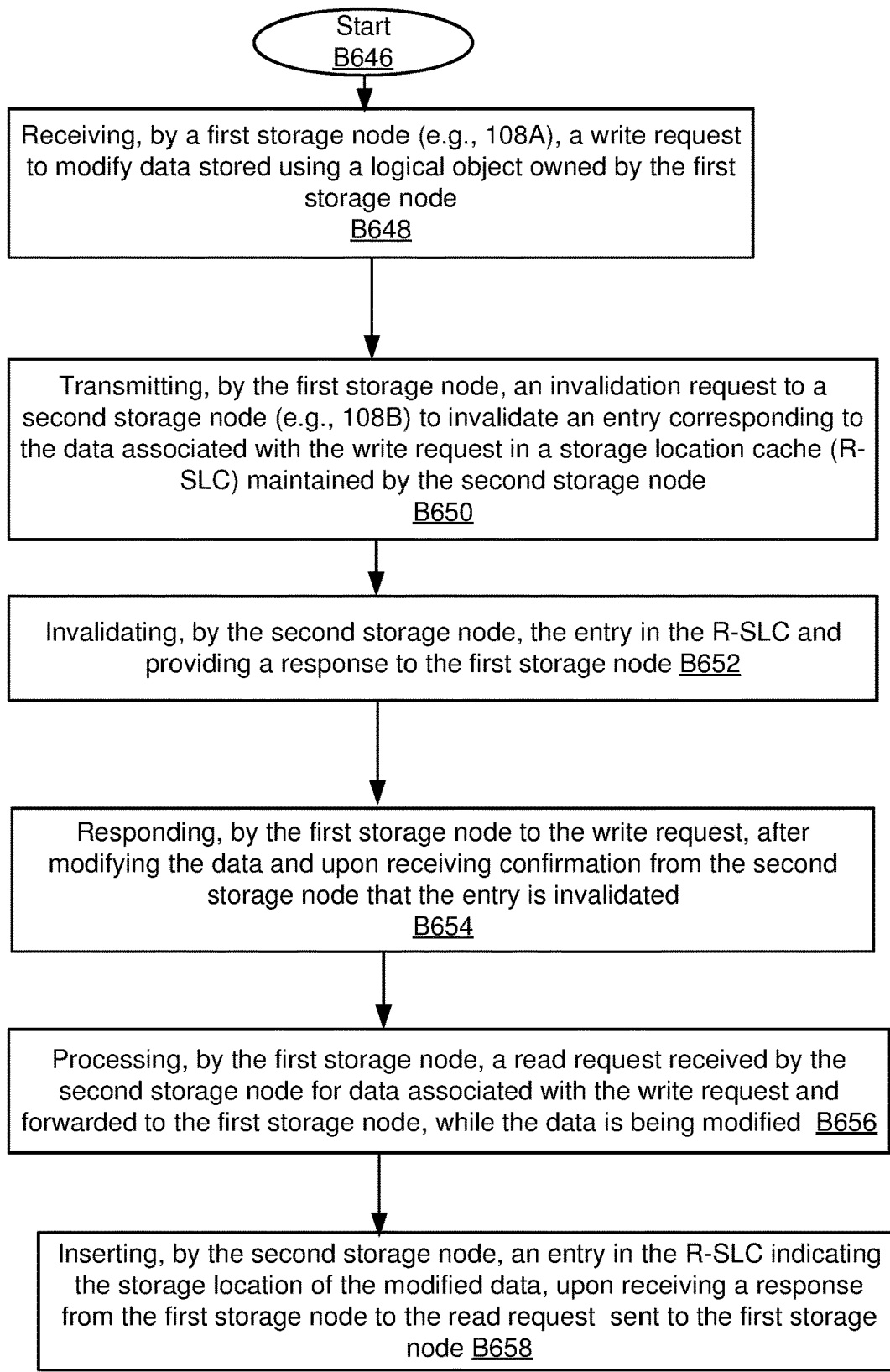
FIG. 6D shows a process for invalidating an entry of a R-SLC, according to aspects of the present disclosure.

Process 644:

FIG. 6D shows a process 644 for invalidating an entry in the R-SLC 120 for which a write request is received by a LON, according to one aspect of the present disclosure. Process 644 begins in block B646, when the storage system nodes 108A and 108B have been configured as partner nodes e.g., by using the management console 132 (FIG. 1A). The examples described below are based on the storage system node 108A being the LON and the storage system node 108B as the remote node i.e., the non-LON node. The adaptive aspects of the present disclosure can be implemented with storage system node 108B as the LON and the storage system node 108A as the non-LON.

In block B648, LON 108A receives a write request to modify data stored by a logical object (LUN) owned by LON 108A. The write request can be received from application 126, VM130, client 116 or any other entity. The write request may include a data container identifier and an FBN.

In block B650, the LON 108A transmits an invalidation request to the remote node 108B to invalidate any entry in the R-SLC 120B associated with the data identified by the FBN of the write request.

In block B652, the remote node 108B scans the R-SLC 120B to determine if the data container identifier and the FBN identified by the write request exist in the R-SLC 120B. If an entry exists, then the remote node 108B invalidates the entry. In one aspect, a flag indicating a valid or invalid entry is used for each R-SLC 120 entry. The remote node 108B sets the invalid flag for the entry. The remote node 108B transmits a response to the LON 108A indicating successful invalidation. If an entry does not exist, then the response indicates that there is no entry to invalidate.

In block B654, the LON 108A responds to the write request after the data is modified (e.g., by the write module 504) and the response to the invalidation request is received.

In block B656, the LON 108A responds to a read request for the same data associated with the write request. The read request is received by the remote node 108B and forwarded to the LON 108A, since the entry associated with the data was invalidated in block B652. A response to the read request with the requested data and the storage location information for where the data is stored is sent to the remote node 108B.

In block B658, the remote node 108B (e.g. the read module 508) extracts the storage location information from the response received from the LON 108A. The remote node 108B inserts an entry in the R-SLC 120B associated with the data for the read request.

The entry identifies the data container, the FBN and the storage location where the requested data is stored. Furthermore, an entry is inserted in the R-HAC 146 that stores inode attributes for the L1 blocks associated with the requested data (i.e. the L0 blocks). The inode attributes can change and the R-HAC 146 entry is used to ensure the latest attributes are used. If a LUN is deleted, then a message is sent to the remote node 108B so that a corresponding R-HAC 146 entry for the inode can be deleted. Furthermore, if a LUN has been expanded then the remote node 108B is notified. To decrease a LUN size, the remote node 108B is notified, the remote node 108B updates the R-HAC 146 and notifies the LON 108A of the update. Thereafter, the LUN size is decreased by the LON 108A.

When another request for the same data is received by the remote node 108B, the inserted entry from R-SLC 120B is used to determine the storage location of the requested data. The remote node 120B (e.g. the read module 508) retrieves the requested data from the storage location indicated by the R-SLC 120B, without sending the read request to the LON 108A. The remote node 108B prepares a response to the read request and sends the requested data to the requesting device/application.

Process 644 technology also reduces latency in processing read requests that are received by the non-LON (108B in the above example) for data stored by the LON (108A in the above example). Using the innovative R-SLC 120, the non-LON does not send all read requests to the LON, and instead responds to read requests directly. This saves time which is very desirable for data centers using SAN storage arrays that are accessed by SAN protocols. Furthermore, if a there is a conflict with a write request for the same data that is requested by the read request, the invalidation request processing described above ensures that only the most recent version of the requested data is provided by the non-LON.

In one aspect, a method executed by one or more processors is provided. The method includes receiving (e.g., B648, FIG. 6D), by a first storage node (e.g., 108A, FIG. 1B), a request to modify data stored using a logical storage object presented by the first storage node, the first storage node communicating with a second storage node (e.g., 108B, FIG. 1B) configured as a failover partner of the first storage node; transmitting (e.g., B650, FIG. 6D), by the first storage node, an invalidation request to the second storage node to invalidate an entry in a storage location cache (e.g., 120B, FIG. 1B) of the second storage node, the entry indicating a storage location where data is stored by the first storage node, before modification; and responding (e.g., B654, FIG. 6D), by the first storage node, to the request, after modifying the data and upon receiving a response from the second storage node indicating successful invalidation of the entry.

The method further includes providing (e.g., B658, FIG. 6D), by the first storage node, the modified data to the second storage node, in response to a read request received by the second storage node and forwarded to the first storage node; updating (e.g., B658, FIG. 6D), by the second storage node, the storage location cache with an entry in the storage location cache indicating a storage location of the modified data; and utilizing (e.g., B658, FIG. 6D), by the second storage node, the entry for the modified data to respond to another read request for the modified data, received by the second storage node.

Figure 6E:
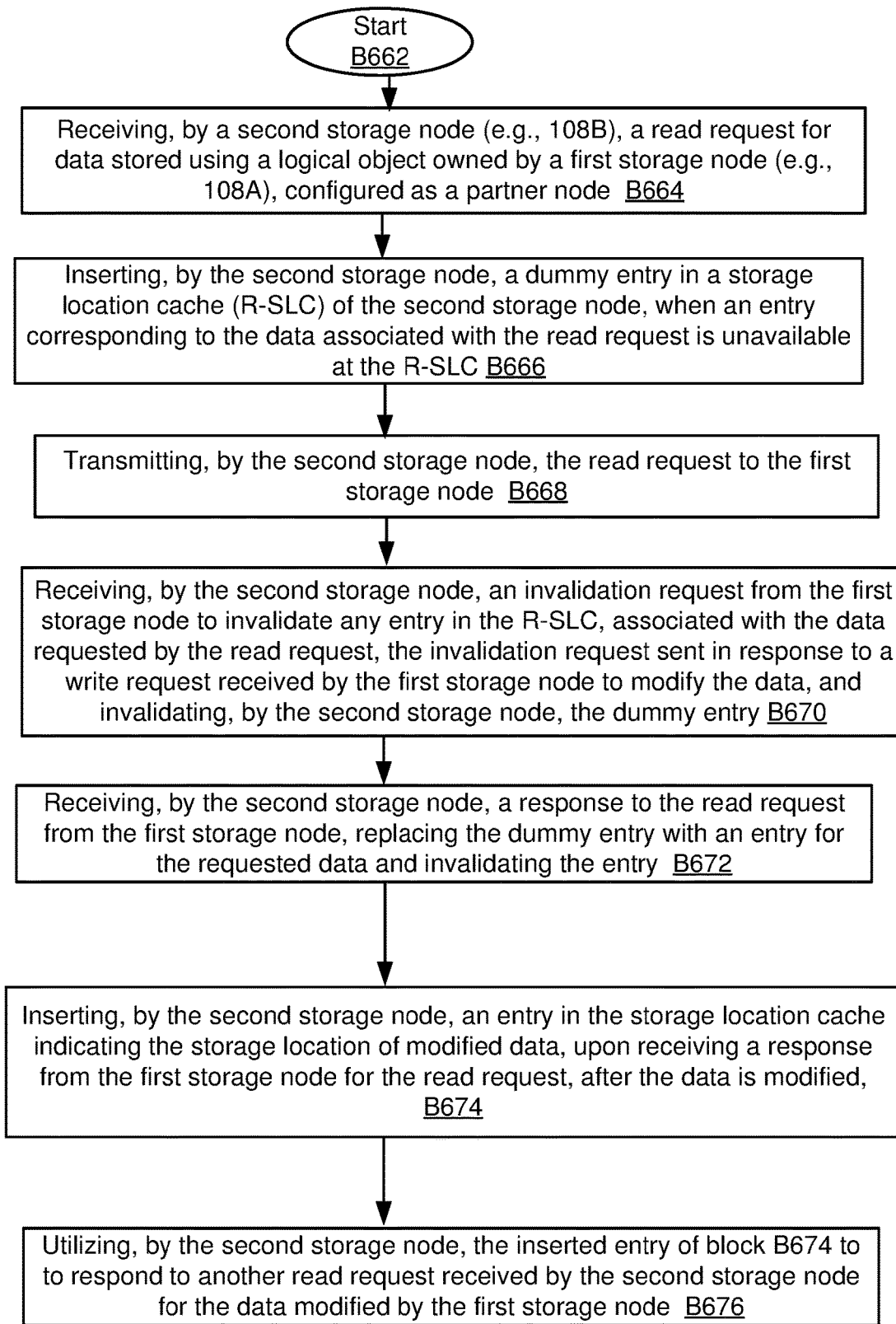
FIG. 6E shows a process for handling race conditions during read/write requests, according to aspects of the present disclosure.

Process 660:

FIG. 6E shows a process 660 for avoiding race conditions that may occur during the usage of the R-SLC 120B for remote reads and local writes (i.e. writes by the LON), according to one aspect of the present disclosure. Process 660 begins in block B662, when the storage system nodes 108A and 108B have been configured as partner nodes e.g., by using the management console 132 (FIG. 1A). The examples described below are based on the storage system node 108A being the LON and the storage system node 108B as the remote node i.e., the non-LON node. The adaptive aspects of the present disclosure can be implemented with storage system node 108B as the LON and the storage system node 108A as the non-LON.

In one aspect, process 660 addresses the following race condition: (a) Assume at time T1, a read request is sent to the LON 108A by the remote node 108B for the data requested by the read request. The read request reaches the LON 108A. (b) At time T2, a write request for the same data requested by the read request is received by the LON 108A. The LON 108A then sends an invalidation request to the remote node 108B. Since a response to the read request may not have reached the remote node 108B, there may be no R-SLC entry associated with the read request/write request. Therefore, the remote node 108B has nothing to invalidate. (c) At time T3, a response to the read request is sent to the remote node 108A by the LON 108A, and the response reaches the remote node 108B. The remote node 108B then inserts an entry in the R-SLC 120B. (d) At time T4, the write request from time T2 is processed. This makes the inserted entry at time T3 by the remote node, stale and hence cannot be used to process read requests by the remote node 108B.

In another aspect, process 660 also addresses the following race condition: (a) Assume that at time T1, a remote read request is sent to the LON 108A by the remote node 108B for data requested by the remote read request. The read request reaches the LON 108A. (b) At time T2, a response to the read request is sent by the LON 108A to the remote node 108B. (c) At time T3, before the response to the read request reaches the remote node 108B, a write request to modify the data associated with the read request at time T1 is received by the LON 108A. The LON 108A then sends an invalidation request to the remote node 108B. (d) At time T4, the invalidation request is received by the remote node 108B. Since a response to the read request may not have reached the remote node 108B, there is no R-SLC 120B entry associated with the read request. Therefore, the remote node 108B has nothing to invalidate. (e) At time T5, the response to the read request sent by the LON 108A at time T2, reaches the remote node 108B. In response, the remote node 108B inserts an entry in the R-SLC 120B. (f) At time T6, the write request from time T3 is processed. This now makes the inserted entry at time T5, stale and hence cannot be used to process read requests by the remote node 108B.

Referring now to FIG. 6E, in block B664, the remote note 108B receives a read request for data stored by a logical object (LUN) owned by the LON 108A. The read request can be received from application 126, VM130, client 116 or any other entity. The read request may include a data container identifier and an associated FBN.

In block B666, the remote node 108B (e.g. the read module 508) checks the R-SLC 120B to determine if an entry already exists for the data requested by the read request. The remote note 108B scans the R-SLC 120B to determine if the data container identifier and the FBN exists in the R-SLC 120B for the requested data. If an entry does not exist, then the remote node 108B assigns a "dummy" entry (or a shell entry) for the read request. The dummy entry includes the FBN, and the data container identifier but does not include a storage location. Thereafter, in block B668, the remote node 108B transmits the read request to the LON 108A.

In block B670, the remote node 108B receives an invalidation request from the LON 108A to invalidate any entry associated with the same data that was requested by the read request. The LON 108A sends the invalidation request after receiving a write request to modify the same data that was requested by the read request. The remote node 108B invalidates the dummy entry in response to the invalidation request.

In block B672, the remote node 108B receives a response to the read request that was sent in block B668. The remote node 108B replaces the dummy entry with an actual entry having the storage location information and then invalidates the actual entry.

In block B674, the remote node 108B extracts the storage location information from a response received from the LON 108A with the modified data. The remote node 108B inserts an entry in the R-SLC 120B. The entry identifies the data container and the FBN, as well as the location where the requested data is stored. Furthermore, an entry is inserted in the R-HAC 146 that stores inode attributes for the L1 blocks associated with the requested data (i.e. the L0 blocks). The inode attributes can change and the R-HAC 146 entry is used to ensure the latest attributes are used. If a LUN is deleted, then a message is sent to the remote node 108B so that a corresponding R-HAC entry for the inode can be deleted. Furthermore, if a LUN has been expanded then the remote node 108B is notified. To decrease a LUN size, the remote node 108B is notified, the remote node 108B updates the R-HAC 146 and notifies the LON 108A of the update. Thereafter, the LUN size is decreased by the LON 108A.

In block B676, when another request for the same data is received by the remote node 108B, the inserted entry from R-SLC 120B is used to determine the storage location of the requested data. The remote node 120B retrieves the requested data from the storage location indicated by the R-SLC 120B, without sending the read request to the LON 108A. The remote node 108B prepares a response to the read request and sends the requested data to the requesting device/application.

Process 660 technology reduces latency in processing read requests that are received by the non-LON (108B in the above example) for data stored by the LON (108A in the above example) and solves the race conditions described above. Using the innovative R-SLC 120, the non-LON does not send the read requests to the LON, and instead responds to read requests directly. This saves time which is very desirable for data centers using SAN storage arrays that are accessed by SAN protocols.

In one aspect, a method executed by one or more processors for handling the race conditions described above is provided. The method includes generating (e.g., B666, FIG. 6E), by a first storage node (e.g., 108B, FIG. 1B), a dummy entry in a storage location cache (e.g., 120B, FIG. 1B) of the first storage node, the dummy entry associated with a read request received by the first storage node for data stored using a logical object owned by a second storage node (e.g., 108A, FIG. 1B) configured as a failover partner node of the first storage node, the dummy entry generated, when a storage location entry indicating a storage location of the data is unavailable at the storage location cache; transmitting (e.g., B668, FIG. 6E), by the first storage node, the read request to the second storage node; receiving (e.g., B670, FIG. 6E), by the first storage node, an invalidation request to invalidate any storage location entry associated with the data, the invalidation request sent in response to the second storage node receiving a write request to modify the data; invalidating (e.g., B668, FIG. 6E), by the first storage node, the dummy entry; receiving (e.g., B672, FIG. 6E), by the first storage node, a response to the read request from the second storage node with the requested data; and replacing (e.g., B672, FIG. 6E), by the first storage node, the dummy entry with a storage location entry and invalidating the storage location entry based on the invalidated dummy entry.

The method further includes inserting (e.g., B674, FIG. 6E), by the first storage node, another storage location entry in the storage location cache indicating the storage location information for data modified by the first storage node, in response to the write request; and utilizing (e.g., B676, FIG. 6E), by the first storage node, the inserted another storage location entry to determine the storage location of the modified data to respond to another read request for the modified data received by the first storage node.

In one aspect, the invalidation request is received by the first storage node, before the response to the read request is received from the second storage node; the second storage node executes the write request, after sending the response to the read request; the response to the read request is sent by the second storage node prior to sending the invalidation request; and the first storage node receives the response to the read request after receiving the invalidation request.

Figure 6F:
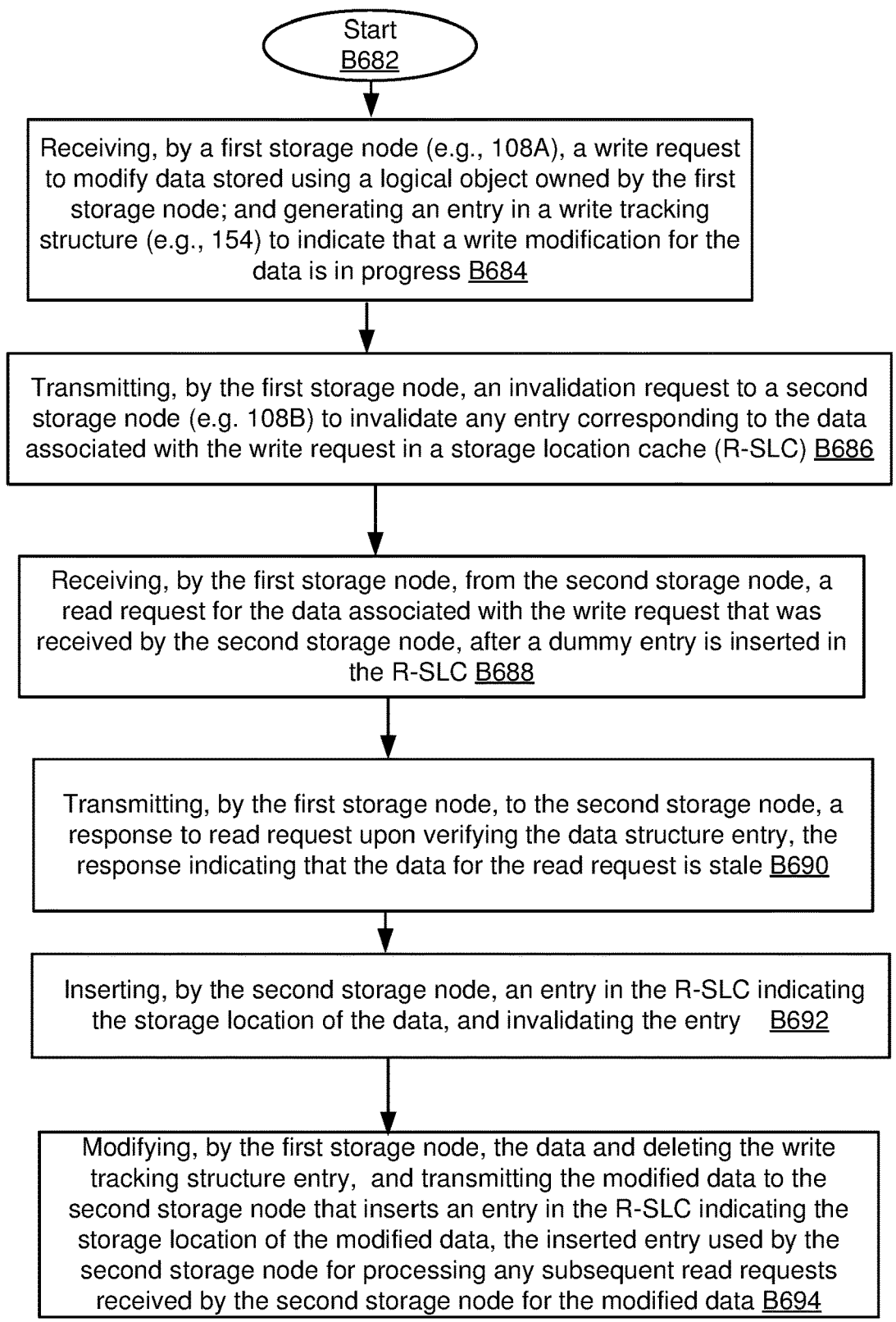
FIG. 6F shows another process for handling race conditions during read/write requests, according to aspects of the present disclosure.

Process 680: FIG. 6F shows a process 680 for avoiding another race condition that may occur during the usage of R-SLC 120B, according to one aspect of the present disclosure. Process 680 begins in block B682, when the storage system nodes 108A and 108B have been configured as partner nodes e.g., by using the management console 132 (FIG. 1A). The examples described below are based on the storage system node 108A being the LON and the storage system node 108B as the remote node i.e., the non-LON node. The adaptive aspects of the present disclosure can be implemented with storage system node 108B as the LON and the storage system node 108A as the non-LON.

In one aspect, process 680 addresses the following race condition: (a) Assume that at time T1, a write operation for an FBN is received by the LON 108A. The LON 108A sends an invalidation request to the remote node 108B. If there has been no remote read request for the same data/FBN, no entry exists at the R-SLC 120B. Therefore, the remote node 108B has nothing to invalidate. (b) At time T2, the remote node 108B sends a read request to the LON 108A for the same data as the write request of time T1. The read request reaches the LON 108A. (c) At time T3, a remote read reply from the LON 108A is sent to the remote node 108A and the reply successfully reaches the remote node 108B. In response, the remote node 108B inserts an entry in the R-SLC 120B. (d) At time T4, the write request from time T1 is processed. This makes the inserted entry at time T3, stale and hence cannot be used to process remote read requests by the remote node 108B.

Referring to FIG. 6F, in block B684, the LON 108A receives a write request to modify data stored by the LON 108A. The write request includes the FBN of a data container. The LON 108A (e.g. the write module 504) generates an entry in a data structure (e.g., 154, FIG. 5C) that stores a hash value 520 corresponding to the FBN of the write request. The hash value is associated with a flag 532 that indicates a write operation is in progress.

In block B686, the LON 108A sends an invalidation request to the remote node 108B to invalidate any entry that is associated with the data container identified by the write request. The remote node 108B responds to the request indicating that there is no entry to add.

In block B688, the remote node 108B receives a read request for the same data associated with the write request of block B684. The remote note 108B receives the read request from application 126, VM130, client 116 or any other entity. The read request may include a data container identifier and an associated FBN. The remote node 108B (e.g., the read module 508) scans the R-SLC 120B to determine if an entry already exists for the data requested by the read request. If an entry does not exist, then the remote node 108B assigns a "dummy" entry (or a temporary entry) to the read request. Thereafter, the remote node 108B transmits the read request to the LON 108A and the LON 108A receives the read request.

In block B690, the LON 108A checks the data structure 154 to determine that a write operation for the same FBN in the read request is in progress. The LON 108A sends the old data for the read request with a flag indicating to the read request that the data is old.

In block B692, the remote node 108B receives the response to the read request. The remote node 108B replaces the dummy entry with an entry in the R-SLC 120B and invalidates the entry since the received data is old, as indicated by the LON 108A response.

In block B694, when the data for the write request is updated, the LON 108A transmits the updated data to the remote node 108B in a response. The entry in data structure 154 is deleted. The remote node 108B extracts the storage location information from the response received from the LON 108A. The remote node 108B inserts an entry in the R-SLC 120B. The entry identifies the data container/FBN as well as the location of where the requested data is stored. Furthermore, an entry is inserted in the R-HAC 146 that stores inode attributes for the L1 blocks associated with the requested data (i.e. the L0 blocks). The inode attributes can change and the R-HAC 146 entry is used to ensure the latest attributes are used. If a LUN is deleted, then a message is sent to the remote node 108B so that a corresponding R-HAC entry for the inode can be deleted. Furthermore, if a LUN has been expanded then the remote node 108B is notified. To decrease a LUN size, the remote node 108B is notified, the remote node 108B updates the R-HAC 146 and notifies the LON 108A of the update. Thereafter, the LUN size is decreased by the LON 108A.

When another request for the same data is received by the remote node 108B, the inserted entry from R-SLC 120B is used to determine the storage location of the requested data. The remote node 120B retrieves the requested data from the storage location indicated by the R-SLC 120B, without sending the read request to the LON 108A or using the data structure 154. The remote node 108B prepares a response to the read request and sends the requested data to the requesting device/application.

Process 680 technology reduces latency in processing read requests that are received by the non-LON (108B in the above example) for data stored by the LON (108A in the above example) and solves the race conditions described above. Using the innovative R-SLC 120, the non-LON does not send the read requests to the LON, and instead responds to read requests directly. This saves time which is very desirable for data centers using SAN storage arrays that are accessed by SAN protocols. Furthermore, because the entry in the write tracking structure 154 is deleted after a write operation is completed, the storage footprint for storing the write tracking structure 154 is small, which is desirable.

In one aspect, a method executed by one or more processors for handling the race conditions described above is provided. The method includes generating (e.g., B684, FIG. 6F) by a first storage node (e.g., 108A, FIG. 1B), in response to receiving a write request to modify data of a logical object managed by the first storage node, an entry in a data structure (e.g., 154, FIG. 5C) to indicate that a write operation to modify the data is in progress; transmitting (e.g., B686, FIG. 6F), by the first storage node, an invalidation request to a second storage node to invalidate any entry in a storage location cache of the second storage node that indicates a storage location of the data, the second storage node configured as a partner failover node of the first storage node; receiving (e.g., B690, FIG. 6F), by the first storage node, a response to the invalidation request from the second storage node, the response indicating no entry existed at the storage location cache; receiving (e.g., B688, FIG. 6F), by the first storage node, a read request from the second storage node for the data;

verifying (e.g., B690, FIG. 6F), by the first storage node, the entry in the data structure, in response to the read request; transmitting (e.g., B690, FIG. 6F), by the first storage node, the data before completing the write request with the entry from the data structure to indicate to the second storage node that the data is stale, and the second storage node inserts an entry in the storage location cache indicating a location of the data and invalidates the inserted entry, based on the data structure entry received from the first storage node; and completing (e.g., B694, FIG. 6F), by the first storage node, the write request to modify the data, and deleting the entry from the data structure.

The method further includes inserting (e.g., B692, FIG. 6F), by the second storage node, a dummy entry associated with the read request, the dummy entry indicating a storage location of the data is unavailable at the storage location cache. The method includes processing (e.g., B694, FIG. 6F), by the second storage node, another read request received by the second storage node, after the write request has been processed by the first storage node. The method also includes transmitting (e.g., B694, FIG. 6F), by the first storage node, data modified by the write request to the second storage node, to complete the read request.

In one aspect, the data structure is maintained by the first storage node and the entry is a hash value (e.g., 520A, FIG. 5C) of a file block number (e.g., 502A, FIG. 5C) included in the write request; the read request is received by the second storage node, after the response to the invalidation request has been sent to the first storage node; and the dummy entry is also invalidated by the second storage node, after the first storage node sends the data with the entry of the data structure.

Figure 6G:
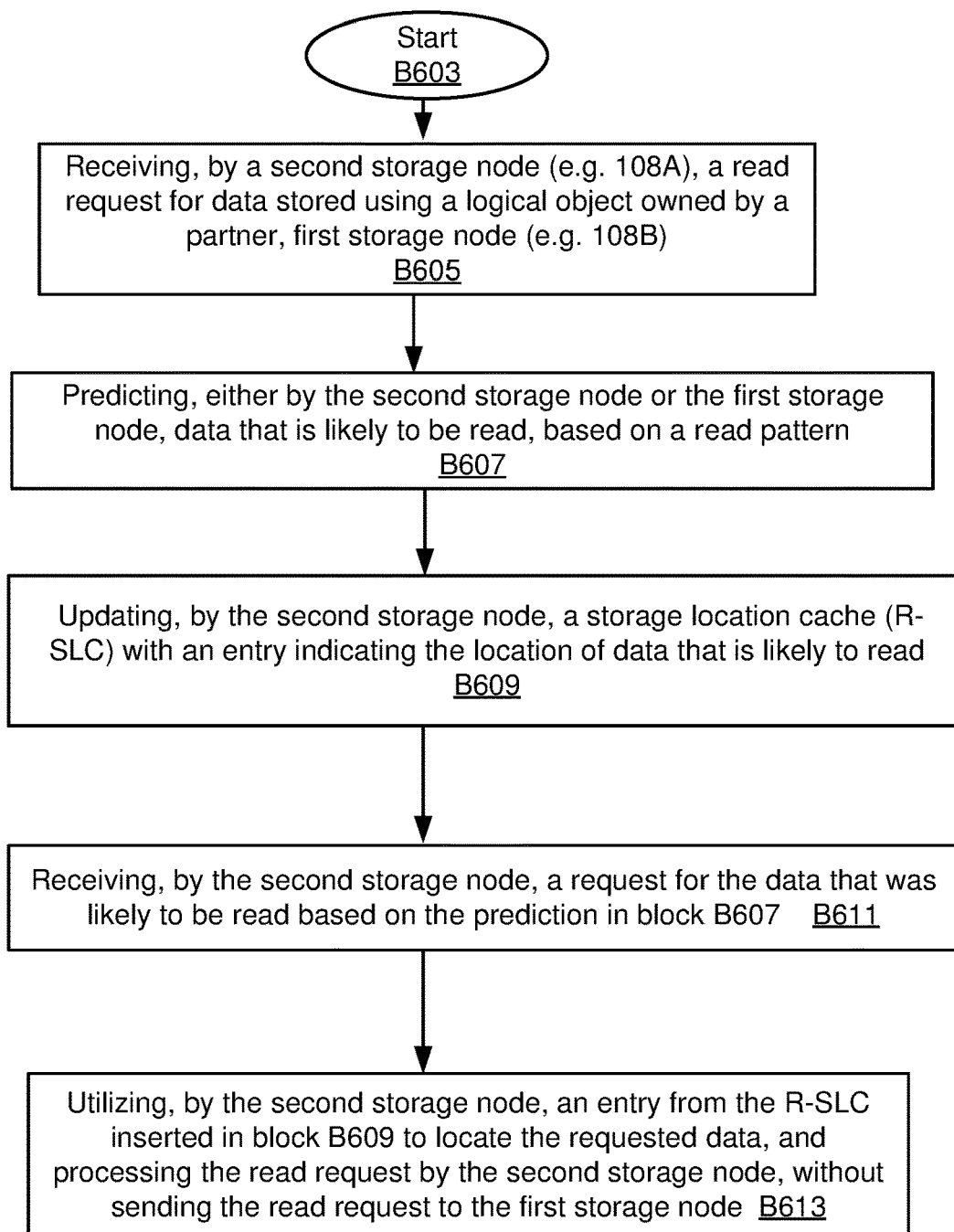
FIG. 6G shows a read ahead process, according to aspects of the present disclosure.

Process 601: FIG. 6G shows a process 601 for using the R-SLC 120 and reading ahead data based on a predicted read pattern for data that is likely to be read, according to one aspect of the present disclosure. Process 601 begins in block B603, when the storage system nodes 108A and 108B have been configured as partner nodes e.g., by using the management console 132 (FIG. 1A). The examples described below are based on the storage system node 108A being the LON and the storage system node 108B as the remote node i.e., the non-LON node. The adaptive aspects of the present disclosure can be implemented with storage system node 108B as the LON and the storage system node 108A as the non-LON.

In block B605, the remote note 108B receives a read request for data stored by a logical object (LUN) owned by the LON 108A. The request can be received from application 126, VM130, Client 116 or any other entity. The read request may include a data container identifier and an associated FBN.

In block B607, a prediction is made to determine what other read requests can be expected for the same data. In one aspect, the prediction is made by the remote node 108B. The prediction is made by a prediction engine interfacing with or is part of the read module 508. The prediction is based on tracking the FBNs over time and predicting a read pattern, e.g., if the read requests are sequential, then the prediction engine can predict the next data blocks that are likely to be read. The remote node 108B obtains the storage location information from the LON 108A for the predicted read ahead data. In another aspect, the remote node 108B forwards the read request to the LON 108A that makes a prediction based on the read requests received by both the LON 108A and 108B. In that instance, the LON 108B provides the storage location information and data container attributes to the remote node 108B, e.g., the data container identifier, the FBN or any other information.

In block B609, the remote node 108B updates the R-SLC 120B with entries for data that may be requested in the future, as part of the read ahead operation. Each entry identifies the data container, the FBN as well as the storage location where the data is stored.

In block B611, when request for the read-ahead data is received by the remote node 108B, the inserted entries in the R-SLC 120B are used to determine the storage location of the requested data in block B613. Thereafter, the remote node 120B retrieves the requested data from the storage location(s) indicated by the R-SLC 120B, without sending the read requests to the LON 108A. The remote node 108B prepares a response to the read requests and sends the requested data to the requesting device/application.

Process 601 technology involving read ahead operations reduces latency in processing read requests that are received by the non-LON (108B in the above example) for data stored by the LON (108A in the above example). Using the innovative R-SLC 120, the non-LON does not send the read requests to the LON, and instead responds to read requests directly by storing entries in the R-SLC 120B for data that may be read in the future. This saves time which is very desirable for data centers using SAN storage arrays that are accessed by SAN protocols.

In one aspect, read-ahead methods and systems are provided for a networked storage system. One method includes: receiving (e.g., B605, FIG. 6G), by a second node (e.g. 108B, FIG. 1B), a read request to read data stored by a first node via a logical object owned by the first node (e.g., 108A, FIG. 1B); receiving, by the second node, information regarding data stored at a storage location managed by the first node that is likely to be read, wherein the data that is likely to be read is predicted based on the read request (e.g., B607, FIG. 6G); updating (e.g., B609, FIG. 6G), by the second node, a storage location cache (e.g., 120B, FIG. 1B) with an entry that points to the storage location where data that is likely to be read is stored; retrieving (B613, FIG. 1G), by the second node, the data that is likely to be read; and utilizing e.g., B613, FIG. 6G), by the second node, the storage location cache entry to process any read request received for the data that is likely to be read.

The method further includes utilizing, by the second storage node, the read request to predict data that is likely to be read; and transmitting, by the second storage node, a request to the first storage node to provide information regarding the data that is likely to be read. The method also includes transmitting, by the second storage node, to the first storage node, information regarding the read request for data; and predicting, by the first storage node, the data that is likely to be read, based on the information received from the second storage node regarding the read request for data. The method further includes providing, by the first storage node, to the second storage node, information regarding the data that is likely to be read.

In one aspect, the first storage node predicts the data that is likely to be read based on another read request received by the first storage node and information regarding the read request received by the second storage node; the second storage node stores the data that is likely to be read in a buffer cache and updates the storage location cache to indicate a storage location in the buffer cache where the data is stored; and the information regarding the data that is likely to be read includes a physical volume block number identifying the storage location of the data likely to be read.

Figure 6H:
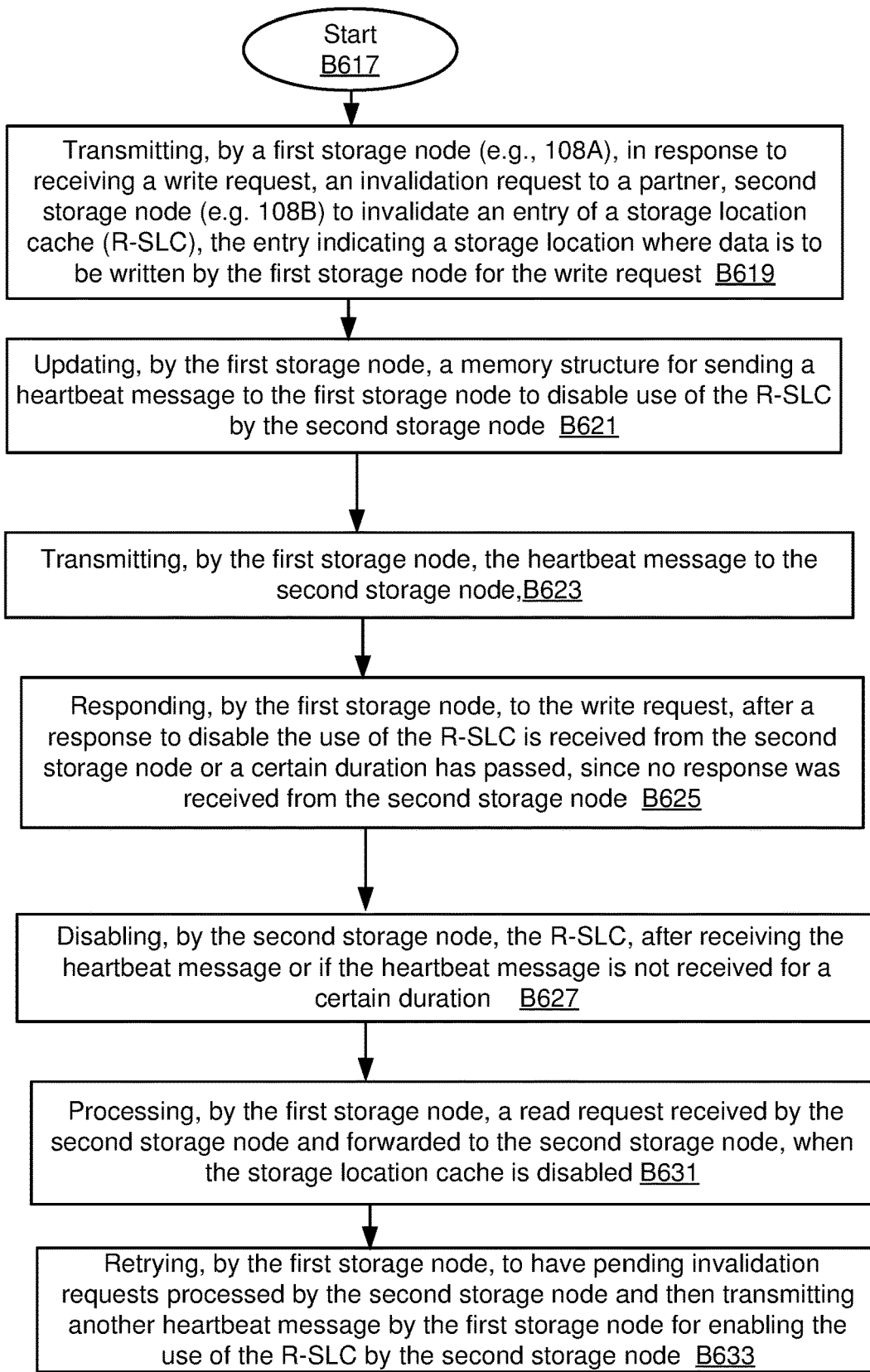
FIG. 6H shows a process flow for disabling and enabling a R-SLC, according to aspects of the present disclosure.

Process 615: FIG. 6H shows a process 615 for enabling and disabling the R-SLC 120B via heartbeat messages, according to one aspect of the present disclosure. Process 615 begins in block B617, when the storage system nodes 108A and 108B have been configured as partner nodes. The example described below is based on the storage system node 108A as the LON and the storage system node 108B operates as the remote node i.e., the non-LON node. A heartbeat message is typically sent by the heartbeat thread 534 at fixed time intervals by each node 108A/108B to ensure that the other node is operational and alive. In process 615, the heartbeat message is used to disable and enable R-SLC at the remote node 108B using heartbeat structure 148 shown in FIG. 5B.

In block B619, the LON 108A receives a write request to modify data stored by the LON 108A. The write request indicates the FBN of a data container. The LON 108A generates an entry in the data structure (e.g., 154, FIG. 5C) that stores a hash value 520 corresponding the FBN 506. The hash value is associated with a flag 532 that indicates a write operation is in progress. The LON 108A sends an invalidation request to the remote node 108B to invalidate any entry that is associated with the FBN identified by the write request. The LON 108A waits for a certain duration and if a response is not received from the remote node 108B, then in block B621, the LON 108A updates the disable bit 524 of the heartbeat structure 148. This indicates to the heartbeat message thread 534 executed by the LON 108A to include the updated disable bit value in the next heartbeat message to the remote 108B indicating that it has to disable the R-SLC 120B entry for the FBN associated with the write request. In one aspect, the heartbeat message thread 534 is part of the storage operating system 134 and is configured to send heartbeat messages to the remote node 108B at certain time intervals. Thereafter, in block B623, a heartbeat message is sent by the LON 108A to the remote node 108B. In one aspect, the heartbeat message is sent by an RDMA (remote direct memory access) enabled adapter, e.g., the cluster adapter 712, FIG. 7.

In block B625, the LON 108A responds to the write request, if a response has been received from the remote node 108A or after a certain duration has passed.

In block B627, the remote node 108B disables the use of R-SLC 120B and sets the "Disable-Ack" bit 530 in the heartbeat structure 148, if it receives the heartbeat message from the LON 108A or a certain duration has passed and no heartbeat message has been received from the LON 108A. This indicates to the heartbeat thread of remote node 108B to send an acknowledgement in a next heartbeat message to the LON 108A that the use of R-SLC 120B has been disabled.

In block B631, any read request received by the remote node 108B is forwarded for processing, while the R-SLC 120B is disabled. In block B633, the LON 108A resends the invalidation request to the remote 108B for processing. In one aspect, the LON 108A uses a queue to track all pending invalidation requests. Once all pending invalidation requests have been processed by the remote node 108B, the disable bit 524 is reversed. This indicates to the heartbeat thread at the LON 108A to indicate to the remote node 108B in the next heartbeat message to enable the use of R-SLC 120B Process 615 technology reduces latency in processing read requests that are received by the non-LON (108B in the above example) for data stored by the LON (108A in the above example). Heartbeat messages are used to efficiently enable and disable the use of R-SLC 120.

In one aspect, a method for using heartbeat messages for enabling and disabling a R-SLC 120 is provided. The method includes: transmitting (e.g., B619, FIG. 6H), by a first storage node (e.g. 108A, FIG. 1B), an invalidation request to a second storage node (e.g. 108B, FIG. 1B) to invalidate an entry of a storage location cache (e.g., 120B, FIG. 1B) of the second storage node, the entry indicating a storage location to write data in response to a write request received by the first storage node, the first and the second storage nodes configured as partner failover nodes; updating (e.g., B612, FIG. 6H) by the first storage node, a memory structure (e.g., 148, FIG. 5B) at the first storage node for sending a heartbeat message to disable use of the storage location cache by the second storage node for processing any read requests received by the second storage node; transmitting (e.g., B623, FIG. 6H), by the first storage node, the heartbeat message to the second storage node to disable use of the storage location cache by the second storage node; and responding (e.g., B625, FIG. 6H), by the first storage node, to the write request, after a response to disable the use of the storage location cache is received from the second storage node or a certain duration, T1, has elapsed since the heartbeat message was sent to the second storage node and no response was received from the second storage node.

The method further includes: disabling (e.g., B627, FIG. 6H), by the second storage node, use of the storage location cache upon updating a memory structure (e.g., 148, FIG. 5B) at the second storage node, after the heartbeat message is received from the first storage node.

The method further includes: disabling (e.g., B627, FIG. 6H), by the second storage node, use of the storage location cache upon updating a memory structure at the second storage node, after the heartbeat message is not received from the first storage node for a certain duration.

The method further includes receiving (e.g., B631, FIG. 6H), by the first storage node, a read request for data from the second storage node, while usage of the storage location cache is disabled; and processing (e.g., B631, FIG. 6H), by the first storage node, the read request. The method further includes enabling (e.g., B633, FIG. 6H), by the first storage node, use of the storage location cache at the second storage node by modifying a bit value in the memory structure.

The method further includes: maintaining, by the first storage node, invalidation requests in a queue; retrying (e.g., B633, FIG. 6H), by the first storage node, to have the invalidation requests processed by the second storage node; and enabling (e.g., B633, FIG. 6H), by the first storage node, use of the storage location cache at the second storage node by modifying a bit value in the memory structure at the first storage node and sending another heartbeat message to the second storage node to enable use of the storage location cache. The method further includes updating (e.g., B633, FIG. 6H), by the first storage node, the memory structure to indicate use of the storage location cache has been enabled, upon receiving an acknowledgment from the second storage node.

Figure 7:
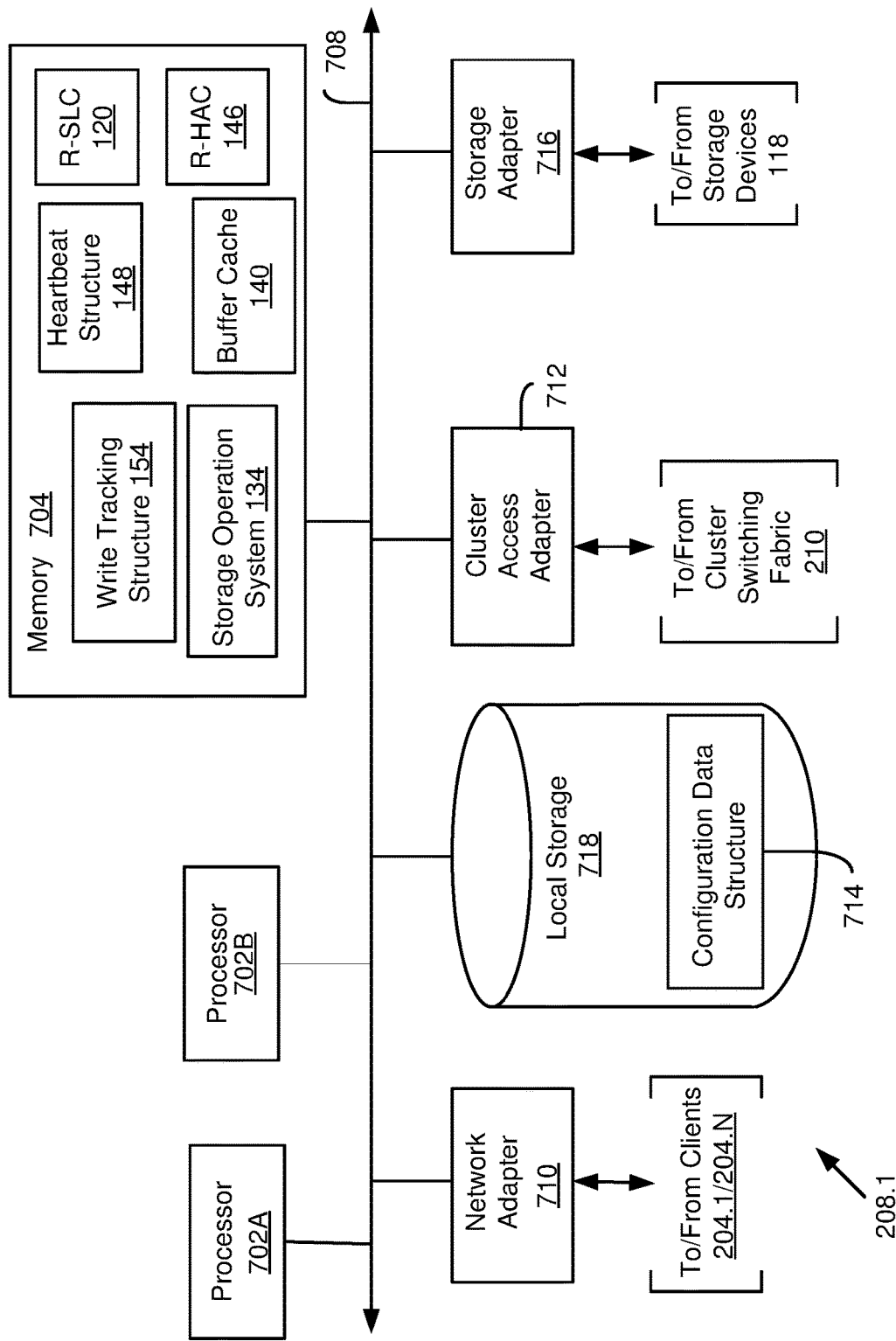
FIG. 7 shows an example of a storage system node, according to aspects of the present disclosure.

Storage System Node:

FIG. 7 is a block diagram of a node 208.1, (including the storage system nodes 108A/108B) that is illustratively embodied as a storage system comprising of a plurality of processors 702A and 702B, a memory 704, a network adapter 710, a cluster access adapter 712, a storage adapter 716 and local storage 718 interconnected by a system bus 708.

Processors 702A-702B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The local storage 718 comprises one or more storage devices utilized by the node to locally store configuration information for example, in a configuration data structure 714.

The cluster access adapter 712 comprises a plurality of ports adapted to couple node 208.1 to other nodes of cluster 202 (FIG. 2A). In the illustrative aspect, Ethernet may be used as the clustering protocol and interconnect media, although it will be apparent to those skilled in the art that other types of protocols and interconnects may be utilized within the cluster architecture described herein. In alternate aspects where the network modules and storage modules are implemented on separate storage systems or computers, the cluster access adapter 712 is utilized by the network/storage module for communicating with other network/storage-modules in the cluster 202. In one aspect, the cluster access adapter 712 is an RDMA adapter that can send heartbeat messages to enable and disable R-SLC use, as described above with respect to FIG. 6H.

Each node 208.1 is illustratively embodied as a dual processor storage system, and the storage operating system 134 that preferably implements a high-level module, such as a file system 240, to logically organize the information as a hierarchical structure of named directories and files at storage 118. However, it will be apparent to those of ordinary skill in the art that the node 208.1 may alternatively comprise a single or more than two processor systems. Illustratively, one processor 702A executes the functions of the network module on the node, while the other processor 702B executes the functions of the storage module.

The memory 704 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 134 portions of which is typically resident in memory and executed by the processing elements, functionally organizes the node 208.1 by, inter alia, invoking storage operation in support of the storage service implemented by the node.

In one aspect, data that needs to be written is first stored at a buffer cache 140 in memory 704. The written data is moved to NVRAM storage, stored at a partner NVRAM (FIG. 1B) and then stored persistently at storage devices 118 during a CP operation.

The network adapter 710 comprises a plurality of ports adapted to couple the node 208.1 to one or more clients 204.1/204.N over point-to-point links, wide area networks, virtual private networks implemented over a public network (Internet) or a shared local area network. The network adapter 710 thus may comprise the mechanical, electrical and signaling circuitry needed to connect the node to the network. Each client 204.1/204.N may communicate with the node over network 206 (FIG. 2A) by exchanging discrete frames or packets of data according to pre-defined protocols, such as TCP/IP.

The storage adapter 716 cooperates with the storage operating system 134 executing on the node 208.1 to access information requested by the clients. The information may be stored on any type of attached array of writable storage device media such as hard drives, solid state drivers, storage class memory, video tape, optical, DVD, magnetic tape, bubble memory, electronic random access memory, micro-electro mechanical and any other storage media adapted to store information, including data and parity information. However, as illustratively described herein, the information is preferably stored at storage device 118.1. The storage adapter 716 comprises a plurality of ports having input/output (I/O) interface circuitry that couples to the storage devices over an I/O interconnect arrangement, such as a conventional high-performance, Fibre Channel link topology.

Figure 8:
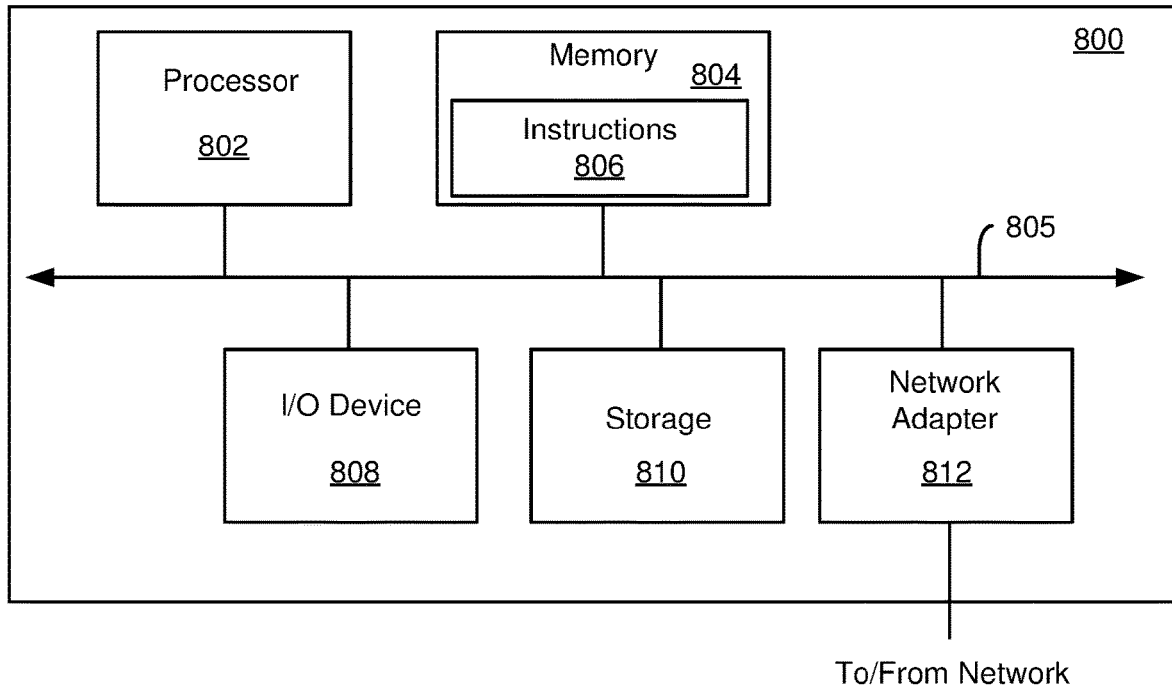
FIG. 8 shows an example of a processing system, used according to aspects of the present disclosure.

Processing System:

FIG. 8 is a high-level block diagram showing an example of the architecture of a processing system 800 that may be used according to one aspect. The processing system 800 can represent storage system node 108, host system 102, management console 132, or clients 116, 204. Note that certain standard and well-known components which are not germane to the present aspects are not shown in FIG. 8.

The processing system 800 includes one or more processor(s) 802 and memory 804, coupled to a bus system 805. The bus system 805 shown in FIG. 8 is an abstraction that represents any one or more separate physical buses and/or point-to-point connections, connected by appropriate bridges, adapters and/or controllers. The bus system 805, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1364 bus (sometimes referred to as "Firewire").

The processor(s) 802 are the central processing units (CPUs) of the processing system 800 and, thus, control its overall operation. In certain aspects, the processors 802 accomplish this by executing software stored in memory 804. The processors 802 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 804 represents any form of random-access memory (RAM), read-only memory (ROM), flash memory, or the like, or a combination of such devices. Memory 804 includes the main memory of the processing system 800. Instructions 806 may be used to implement the R-SLC 120, the R-HAC 146, the heartbeat structure 148 and the write tracking structure 154, and the process steps of FIGS. 6A-6H described above, may reside in and executed (by processors 802) from memory 804.

Also connected to the processors 802 through the bus system 805 are one or more internal mass storage devices 810, and a network adapter 812. Internal mass storage devices 810 may be or may include any conventional medium for storing large volumes of data in a non-volatile manner, such as one or more magnetic or optical based disks, solid state drives, or any other storage media. The network adapter 812 provides the processing system 800 with the ability to communicate with remote devices (e.g., storage servers) over a network and may be, for example, an Ethernet adapter, a Fibre Channel adapter, or the like.

The processing system 800 also includes one or more input/output (I/O) devices 808 coupled to the bus system 805. The I/O devices 808 may include, for example, a display device, a keyboard, a mouse, etc.

Cloud Computing:

The system and techniques described above are applicable and useful in the cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer, is a cloud platform and cloud infrastructure, followed by a "server" layer that includes hardware and computer software designed for cloud specific services, for example, the storage system 108 is accessible as a cloud service. Details regarding these layers are not germane to the embodiments disclosed herein.

Thus, methods and systems for reducing latency in a networked storage environment have been described. Note that references throughout this specification to "one aspect"

(or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method executed by one or more processors, comprising:
   receiving, by a first storage node, a request to modify data stored using a logical storage object presented by the first storage node, the first storage node communicating with a second storage node configured as a failover partner node of the first storage node, and the first storage node maintaining a storage location cache with a plurality of entries indicating storage locations of data stored by the second storage node using another logical storage object;
   transmitting, by the first storage node, an invalidation request to the second storage node to invalidate an entry in a storage location cache of the second storage node, the entry indicating a storage location where data is stored by the first storage node, before modification; and
   responding, by the first storage node, to the request, after modifying the data and upon receiving a response from the second storage node indicating successful invalidation of the entry.

2. The method of claim 1, wherein the request is received by the first storage node from a client computing device.

3. The method of claim 1, wherein the request is received by the first storage node from the second storage node.

4. The method of claim 1, further comprising:
   providing, by the first storage node, the modified data to the second storage node, in response to a read request received by the second storage node and forwarded to the first storage node.

5. The method of claim 4, further comprising:
   updating, by the second storage node, the storage location cache with an entry in the storage location cache indicating a storage location of the modified data.

6. The method of claim 5, further comprising:
   utilizing, by the second storage node, the entry for the modified data to respond to another read request for the modified data, received by the second storage node.

7. The method of claim 1, further comprising:
   setting, by the second storage node, an indicator to indicate the invalidated entry, in response to the invalidation request.

8. A non-transitory machine-readable medium having stored thereon instructions comprising machine executable code which when executed by a machine, causes the machine to:
   receive, by a first storage node, a request to modify data stored using a logical storage object presented by the first storage node, the first storage node communicating with a second storage node configured as a failover partner of the first storage node, the first storage node maintaining a storage location cache with a plurality of entries indicating storage locations of data stored by the second storage node using another logical storage object;
   transmit, by the first storage node, an invalidation request to the second storage node to invalidate an entry in a storage location cache of the second storage node, the entry indicating a storage location where data is stored by the first storage node, before modification; and
   respond, by the first storage node, to the request after modifying the data and upon receiving a response from the second storage node indicating successful invalidation of the entry.

9. The non-transitory machine-readable medium of claim 8, wherein the request is received by the first storage node from a client computing device.

10. The non-transitory machine-readable medium of claim 8, wherein the request is received by the first storage node from the second storage node.

11. The non-transitory machine-readable medium of claim 8, wherein the machine executable code further causes the machine to:
    provide, by the first storage node, the modified data to the second storage node, in response to a read request received by the second storage node and forwarded to the first storage node.

12. The non-transitory machine-readable medium of claim 11, wherein the machine executable code further causes the machine to:
    update, by the second storage node, the storage location cache with an entry in the storage location cache indicating a storage location of the modified data.

13. The non-transitory machine-readable medium of claim 12, wherein the machine executable code further causes the machine to:
    utilize, by the second storage node, the entry for the modified data to respond to another read request for the modified data, received by the second storage node.

14. The non-transitory machine-readable medium of claim 8,
    wherein the machine executable code further causes the machine to:
    set, by the second storage node, an indicator to indicate the invalidated entry, in response to the invalidation request.

15. A system, comprising:
    a memory containing machine-readable medium comprising machine executable code having stored thereon instructions; and a processor coupled to the memory to execute the machine executable code to:
    receive, by a first storage node, a request to modify data stored using a logical storage object presented by the first storage node, the first storage node communicating with a second storage node configured as a failover partner of the first storage node, the first storage node maintaining a storage location cache with a plurality of entries indicating storage locations of data stored by the second storage node using another logical storage object;
    transmit, by the first storage node, an invalidation request to the second storage node to invalidate an entry in a storage location cache of the second storage node, the entry indicating a storage location where data is stored by the first storage node, before modification; and respond, by the first storage node, to the request after modifying the data and upon receiving a response from the second storage node indicating successful invalidation of the entry.

16. The system of claim 15, wherein the request is received by the first storage node from a client computing device.

17. The system of claim 15, wherein the request is received by the first storage node from the second storage node.

18. The system of claim 15, wherein the machine executable code further causes to:
provide, by the first storage node, the modified data to the second storage node, in response to a read request received by the second storage node and forwarded to the first storage node.

19. The system of claim 18, wherein the machine executable code further causes to:
update, by the second storage node, the storage location cache with an entry in the storage location cache indicating a storage location of the modified data.

20. The system of claim 19, wherein the machine executable code further causes to:
utilize, by the second storage node, the entry for the modified data to respond to another read request for the modified data, received by the second storage node.

\* \* \* \* \*